(12) United States Patent
Armstrong et al.

(10) Patent No.: US 7,882,762 B2
(45) Date of Patent: Feb. 8, 2011

(54) SYSTEM FOR MANIPULATING A CONTINUOUSLY VARIABLE TRANSMISSION

(75) Inventors: Oronde Armstrong, Austin, TX (US); Christopher Barrow, Queens Village, NY (US); Paul Elhardt, Carlotte, NC (US); Henry Mack, Phillipsburg, NJ (US); Stephen Miggels, Wyckoff, NJ (US); Stephen Tsotsoros, Hawthorne, NJ (US)

(73) Assignee: Fallbrook Technologies Inc., San Diego, CA (US)

( * ) Notice: Subject to any disclaimer, the term of this patent is extended or adjusted under 35 U.S.C. 154(b) by 854 days.

(21) Appl. No.: 11/409,846

(22) Filed: Apr. 24, 2006

(65) Prior Publication Data

US 2007/0245846 A1    Oct. 25, 2007

Related U.S. Application Data

(60) Provisional application No. 60/763,295, filed on Jan. 30, 2006.

(51) Int. Cl.
*F16C 1/12* (2006.01)
(52) U.S. Cl. .................................................... 74/501.6
(58) Field of Classification Search ................ 74/500.5, 74/501.6, 502.2; 116/28.1, 270, 296
See application file for complete search history.

(56) References Cited

U.S. PATENT DOCUMENTS 1,865,102 A    6/1932    Hayes

| | | |
|---|---|---|
| 2,325,502 A | 7/1943 | Georges |
| 3,292,443 A | 12/1966 | Felix |
| 3,800,607 A | 4/1974 | Zurcher |
| 3,934,493 A * | 1/1976 | Hillyer ........................ 475/297 |

(Continued)

FOREIGN PATENT DOCUMENTS

DE    1171692    6/1964

(Continued)

OTHER PUBLICATIONS

Office Action dated Feb. 17, 2010 from Japanese Patent Application No. 2006-508892.

(Continued)

*Primary Examiner*—Vicky A Johnson
(74) *Attorney, Agent, or Firm*—Knobbe, Martens, Olson & Bear LLP

(57) ABSTRACT

A shifter for use with a continuously variable transmission includes a grip portion and a hub portion. Specifically, the shifter is designed for use on a bicycle, but could also be used with any light vehicle. The grip portion is characterized by a rotatable adjuster that is coupled to a cable. The cable is also coupled to a hub portion. As the adjuster is rotated, the cable is pulled, in turn rotating a pulley assembly in the hub portion. As the pulley assembly is rotated, it advances a rod within a continuously variable transmission. The rod adjusts the power adjusters as described above. The grip portion is also unique in its display of information to the rider. The grip portion includes a display showing the ratio of input to output. The display also includes a filament that curves as the ration is adjusted. A high ratio renders the filament flat while the filament takes on a steep curve as the ratio is adjusted to make riding up hills easier.

14 Claims, 22 Drawing Sheets

U.S. PATENT DOCUMENTS

| | | | |
|---|---|---|---|
| 4,494,524 A | 1/1985 | Wagner | |
| 4,643,048 A | 2/1987 | Hattori et al. | |
| 4,706,518 A | 11/1987 | Moroto et al. | |
| 4,744,261 A | 5/1988 | Jacobson | |
| 4,781,663 A * | 11/1988 | Reswick | 474/49 |
| 4,909,101 A * | 3/1990 | Terry, Sr. | 475/16 |
| 4,976,170 A | 12/1990 | Hayashi et al. | |
| 5,069,655 A | 12/1991 | Schivelbusch | |
| 5,166,879 A | 11/1992 | Greene et al. | |
| 5,194,052 A | 3/1993 | Ueda et al. | |
| 5,269,726 A | 12/1993 | Swanson et al. | |
| 5,318,486 A | 6/1994 | Lutz | |
| 5,413,540 A | 5/1995 | Streib et al. | |
| 5,476,019 A | 12/1995 | Cheever et al. | |
| 5,514,047 A | 5/1996 | Tibbles et al. | |
| 5,526,261 A | 6/1996 | Kallis et al. | |
| 5,607,373 A | 3/1997 | Ochiai et al. | |
| 5,669,846 A | 9/1997 | Moroto et al. | |
| 5,683,322 A | 11/1997 | Meyerle | |
| D391,824 S | 3/1998 | Larson | |
| D391,825 S | 3/1998 | Larson | |
| D396,396 S | 7/1998 | Larson | |
| 5,799,541 A * | 9/1998 | Arbeiter | 74/489 |
| 5,823,058 A | 10/1998 | Arbeiter | |
| 5,839,083 A | 11/1998 | Sugiyama | |
| 5,857,387 A | 1/1999 | Larson et al. | |
| 5,964,123 A | 10/1999 | Arbeiter | |
| 6,000,707 A | 12/1999 | Miller | |
| 6,006,151 A | 12/1999 | Graf | |
| 6,042,132 A * | 3/2000 | Suenaga et al. | 280/260 |
| 6,085,140 A | 7/2000 | Choi | |
| 6,095,945 A | 8/2000 | Graf | |
| 6,182,000 B1 | 1/2001 | Ohta et al. | |
| 6,241,636 B1 | 6/2001 | Miller | |
| 6,251,043 B1 | 6/2001 | Gierling | |
| 6,266,931 B1 | 7/2001 | Erickson et al. | |
| 6,375,412 B1 | 4/2002 | Dial | |
| 6,419,608 B1 | 7/2002 | Miller | |
| 6,449,548 B1 | 9/2002 | Jain et al. | |
| 6,470,252 B2 | 10/2002 | Tashiro et al. | |
| 6,513,405 B1 | 2/2003 | Sturmer et al. | |
| 6,520,878 B1 | 2/2003 | Leclair et al. | |
| 6,522,965 B1 | 2/2003 | Gierling | |
| 6,532,890 B2 * | 3/2003 | Chen | 116/28.1 |
| 6,571,726 B2 * | 6/2003 | Tsai et al. | 116/28.1 |
| 6,588,296 B2 | 7/2003 | Wessel | |
| 6,681,652 B2 | 1/2004 | Auer et al. | |
| 6,684,143 B2 | 1/2004 | Lauer et al. | |
| 6,689,012 B2 | 2/2004 | Miller | |
| 6,694,241 B2 | 2/2004 | Kim | |
| 6,718,247 B1 | 4/2004 | Graf et al. | |
| 6,909,953 B2 | 6/2005 | Joe et al. | |
| 7,011,600 B2 | 3/2006 | Miller et al. | |
| 7,011,602 B2 | 3/2006 | Makiyama et al. | |
| 7,166,052 B2 | 1/2007 | Miller et al. | |
| 7,217,220 B2 | 5/2007 | Careau et al. | |
| 7,343,236 B2 | 3/2008 | Wilson | |
| 7,455,617 B2 | 11/2008 | Miller et al. | |
| 2004/0087412 A1 | 5/2004 | Mori et al. | |
| 2004/0237698 A1* | 12/2004 | Hilsky et al. | 74/502.2 |
| 2005/0172752 A1* | 8/2005 | Florczyk et al. | 74/501.6 |
| 2006/0084549 A1 | 4/2006 | Smithson et al. | |
| 2007/0049450 A1 | 3/2007 | Miller | |
| 2007/0142161 A1 | 6/2007 | Miller | |
| 2007/0155567 A1 | 7/2007 | Miller et al. | |
| 2007/0155580 A1 | 7/2007 | Nichols et al. | |
| 2007/0193391 A1 | 8/2007 | Armstrong et al. | |
| 2007/0219696 A1 | 9/2007 | Miller et al. | |
| 2007/0245846 A1 | 10/2007 | Armstrong et al. | |
| 2009/0164076 A1 | 6/2009 | Vasiliotis et al. | |
| 2009/0312145 A1 | 12/2009 | Pohl et al. | |

FOREIGN PATENT DOCUMENTS

| | | |
|---|---|---|
| DE | 39 40 919 A1 | 6/1991 |
| DE | 4120540 C1 | 11/1992 |
| DE | 10261372 A1 | 7/2003 |
| EP | 0 432 742 | 12/1990 |
| FR | 2590638 | 5/1987 |
| JP | 47-29762 | 11/1972 |
| JP | 49-12742 | 3/1974 |
| JP | 04-272553 | 9/1992 |
| JP | 2003-336732 | 11/2003 |
| WO | WO 02/088573 | 11/2002 |
| WO | WO 2007/077502 | 7/2007 |

OTHER PUBLICATIONS

Office Action dated Feb. 12, 2010 from Japanese Patent Application No. 2009-294086.

International Search Report and Written Opinion dated May 19, 2009 from International Patent Application No. PCT/US2008/083660, filed on Nov. 14, 2008.

International Search Report and Written Opinion dated Feb. 2, 2010 from International Patent Application No. PCT/US2008/068929, filed on Jan. 7, 2008.

* cited by examiner

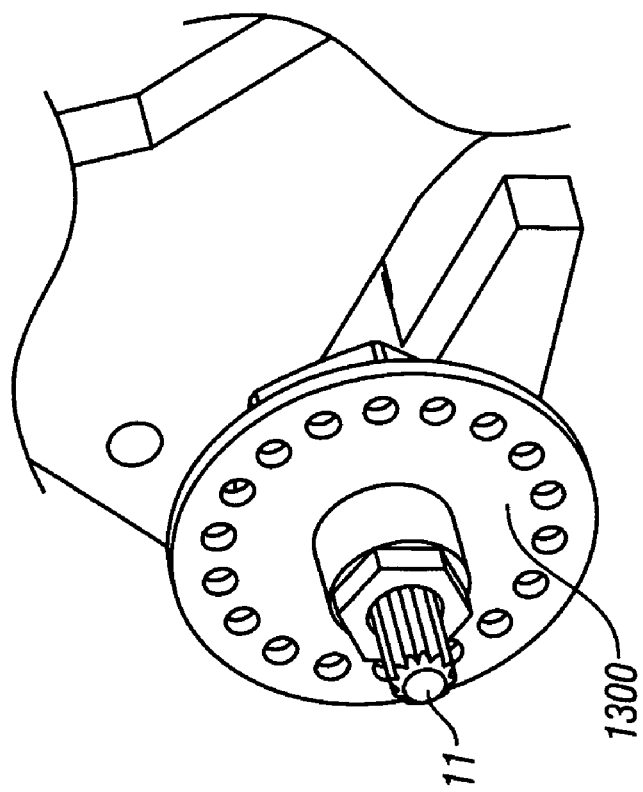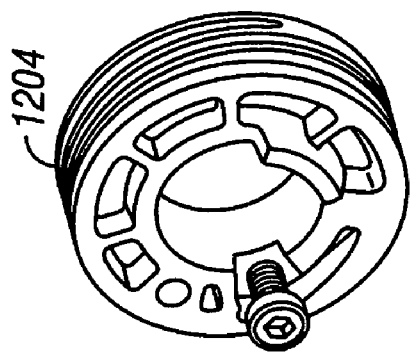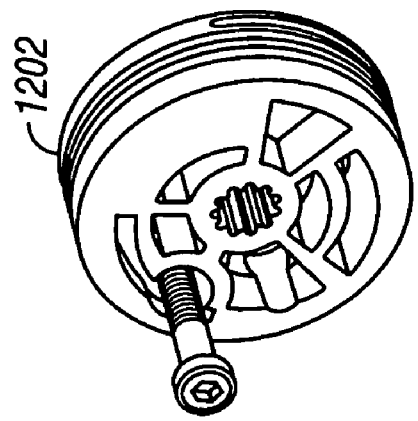
FIG. 12a

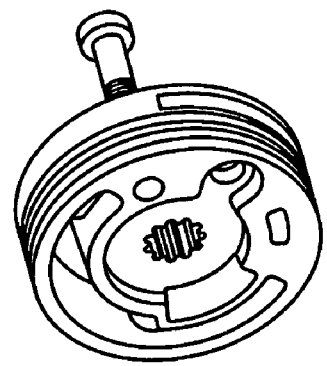
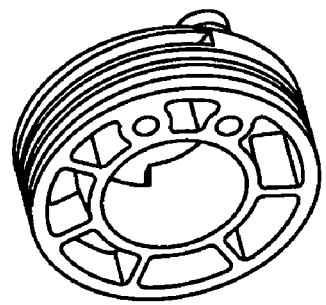
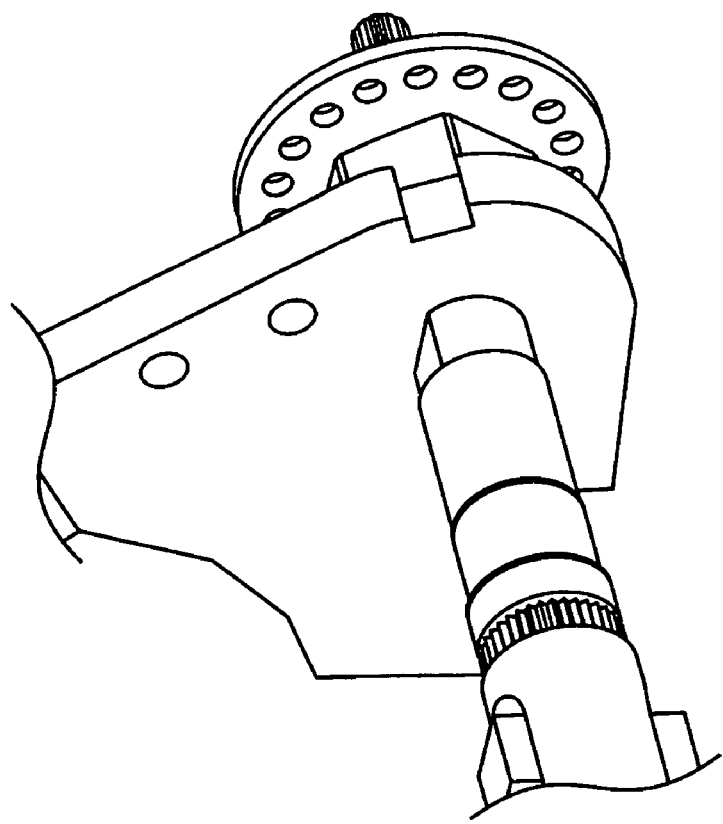
FIG. 12b

SYSTEM FOR MANIPULATING A CONTINUOUSLY VARIABLE TRANSMISSION

RELATED APPLICATIONS

This application claims the benefit of and priority to a U.S. Provisional Patent Application No. 60/763,295 filed Jan. 30, 2006, the technical disclosure of which is hereby incorporated herein by reference.

TECHNICAL FIELD OF THE INVENTION

The present invention relates to a continuously variable transmission and specifically to a means for shifting that transmission through a range of input/output ratios.

BACKGROUND OF THE INVENTION

A transmission is any mechanical linkage that converts an input torque to an output torque. It usually involves a series of gears that have differing diameters, allowing a first gear at a first rotation rate to link to a second gear rotating at a second rate. The most common application for transmissions is in a vehicle. For example, a car may have an automatic transmission or a manual transmission. A bicycle has a transmission that links the pedals to the hub of the rear wheel.

Transmissions allow an input force to be converted into a more useful and appropriate output. However, by using gears and linkages, a typical transmission may only have 4 or 5 ratios available. For example, a four speed automatic transmission in a car has only 4 sets of output gears to couple to the engine's input. A ten speed bike has only ten ratios of input to output. A need exists for a transmission that is not limited by the number of gears. Yet, to place a larger number of gears into a transmission increases its costs and weight and space requirements.

A continuously variable transmission (CVT) is a transmission that eliminates the need for a specified number of gears. Instead it allows an almost limitless number of input to output ratios. This is a benefit because it allows an output to be achieved, i.e. the speed of a vehicle, at an optimal input, i.e. the rpm of the engine. For example, an engine might be most efficient at 1800 rpm. In other words, the peak torque output for the engine might be achieved at this engine rpm, or perhaps the highest fuel economy. Yet, in third gear, the car might be going faster at 1800 rpm than the driver desires. A continuously variable transmission would allow an intermediate ratio to be achieved that allowed the optimal input to achieve the desired output.

There are several examples of continuously variable transmissions. U.S. Pat. No. 6,419,608 is entitled "Continuously Variable Transmission" and is owned by Fallbrook Technologies of San Diego, Calif. It discloses a CVT that uses a series of rolling spheres, also called power adjusters, to couple the input and output. Referring to FIGS. 1 and 2, a prior art continuously variable transmission 100 is disclosed such as the one in the Fallbrook Technologies '608 patent. The transmission 100 is shrouded in a hub shell 40 covered by a hub cap 67. At the heart of the transmission 100 are three or more power adjusters 1a, 1b, 1c which are spherical in shape and are circumferentially spaced equally around the centerline or axis of rotation of the transmission 100. As seen more clearly in FIG. 2, spindles 3a, 3b, 3c are inserted through the center of the power adjusters 1a, 1b, 1c to define an axis of rotation for the power adjusters 1a, 1b, 1c. In FIG. 1, the power adjuster's axis of rotation is shown in the horizontal direction. Spindle supports 2a-f are attached perpendicular to and at the exposed ends of the spindles 3a, 3b, 3c. In one embodiment, each of the spindles supports has a bore to receive one end of one of the spindles 3a, 3b, 3c. The spindles 3a, 3b, 3c also have spindle rollers 4a-f coaxially and slidingly positioned over the exposed ends of the spindles 3a, 3b, 3c outside of the spindle supports 2a-f.

As the rotational axis of the power adjusters 1a, 1b, 1c is changed by tilting the spindles 3a, 3b, 3c, each spindle roller 4a-f follows in a groove 6a-f cut into a stationary support 5a, 5b. Referring to FIGS. 1 and 3, the stationary supports 5a, 5b are generally in the form of parallel disks with an axis of rotation along the centerline of the transmission 100. The grooves 6a-f extend from the outer circumference of the stationary supports 5a, 5b towards the centerline of the transmission 100. While the sides of the grooves 6a-f are substantially parallel, the bottom surface of the grooves 6a-f forms a decreasing radius as it runs towards the centerline of the transmission 100. As the transmission 100 is shifted to a lower or higher gear by changing the rotational axes of the power adjusters 1a, 1b, 1c, each pair of spindle rollers 4a-f located on a single spindle 3a, 3b, 3c, moves in opposite directions along their corresponding grooves 6a-f.

Referring to FIGS. 1 and 3, a centerline hole 7a, 7b in the stationary supports 5a, 5b allows the insertion of a hollow shaft 10 through both stationary supports 5a, 5b. Referring to FIG. 4, in an embodiment of the invention, one or more of the stationary support holes 7a, 7b may have a non-cylindrical shape 14, which fits over a corresponding non-cylindrical shape 15 along the hollow shaft 10 to prevent any relative rotation between the stationary supports 5a, 5b and the hollow shaft 10. If the rigidity of the stationary supports 5a, 5b is insufficient, additional structure may be used to minimize any relative rotational movement or flexing of the stationary supports 5a, 5b. This type of movement by the stationary supports 5a, 5b may cause binding of the spindle rollers 4a-f as they move along the grooves 6a-f.

Referring back to FIGS. 1 and 3, the stationary support 5a is fixedly attached to a stationary support sleeve 42, which coaxially encloses the hollow shaft 10 and extends through the wall of the hub shell 40. The end of the stationary support sleeve 42 that extends through the hub shell 40 attaches to the frame support and preferentially has a non-cylindrical shape to enhance subsequent attachment of a torque lever 43. As shown more clearly in FIG. 7, the torque lever 43 is placed over the non-cylindrical shaped end of the stationary support sleeve 42, and is held in place by a torque nut 44. The torque lever 43 at its other end is rigidly attached to a strong, non-moving part, such as a frame (not shown). A stationary support bearing 48 supports the hub shell 40 and permits the hub shell 40 to rotate relative to the stationary support sleeve 42.

Referring back to FIGS. 1 and 2, shifting is manually activated by axially sliding a rod 11 positioned in the hollow shaft 10. One or more pins 12 are inserted through one or more transverse holes in the rod 11 and further extend through one or more longitudinal slots 16 (not shown) in the hollow shaft 10. The slots 16 in the hollow shaft 10 allow for axial movement of the pin 12 and rod 11 assembly in the hollow shaft 10. As the rod 11 slides axially in the hollow shaft 10, the ends of the transverse pins 12 extend into and couple with a coaxial sleeve 19. The sleeve 19 is fixedly attached at each end to a substantially planar platform 13a, 13b forming a trough around the circumference of the sleeve 19.

As seen more clearly in FIG. 4, the planar platforms 13a, 13b each contact and push multiple wheels 21a-f. The wheels 21a-f fit into slots in the spindle supports 2a-f and are held in place by wheel axles 22a-f. The wheel axles 22a-f are supported at their ends by the spindle supports 2a-f and allow rotational movement of the wheels 21a-f.

Referring back to FIGS. 1 and 2, the substantially planar platforms 13a, 13b transition into a convex surface at their outer perimeter (farthest from the hollow shaft 10). This region allows slack to be taken up when the spindle supports 2a-f and power adjusters 1a, 1b, 1c are tilted as the transmission 100 is shifted. A cylindrical support member 18 is located in the trough formed between the planar platforms 13a, 13b and sleeve 19 and thus moves in concert with the planar platforms 13a, 13b and sleeve 19. The support member 18 rides on contact bearings 17a, 17b located at the intersection of the planar platforms 13a, 13b and sleeve 19 to allow the support member 18 to freely rotate about the axis of the transmission 100. Thus, the bearings 17a, 17b, support member 18, and sleeve 19 all slide axially with the planar platforms 13a, 13b when the transmission 100 is shifted.

Now referring to FIGS. 3 and 4, stationary support rollers 30a-l are attached in pairs to each spindle leg 2a-f through a roller pin 31a-f and held in place by roller clips 32a-l. The roller pins 31a-f allow the stationary support rollers 30a-l to rotate freely about the roller pins 31a-f The stationary support rollers 30a-l roll on a concave radius in the stationary support 5a, 5b along a substantially parallel path with the grooves 6a-f As the spindle rollers 4a-f move back and forth inside the grooves 6a-f, the stationary support rollers 30a-l do not allow the ends of the spindles 3a, 3b, 3c nor the spindle rollers 4a-f to contact the bottom surface of the grooves 6a-f to maintain the position of the spindles 3a, 3b, 3c, and to minimize any frictional losses.

While a continuously variable transmission is artful on paper, the realities of making one work smoothly requires significant effort. For example, a need exists for a method to axially shift the rod 11. Such a shifter would be useful in any environment that the CVT is used. It is also important to consider the difficulties of reducing a CVT in size to work on a bicycle. A need also exists for a method of hand shifting the CVT by the rider.

SUMMARY OF THE INVENTION

The present invention relates to a shifter for use with a continuously variable transmission. Specifically, the shifter is designed for use on a bicycle, but could also be used with any light vehicle. The shifter has a grip portion and a hub portion. The grip portion is characterized by a rotatable adjuster that is coupled to a pair of cables. The cables are also coupled to a hub portion. As the adjuster is rotated, one cable is shortened around a grip pulley, in turn rotating a pulley assembly in the hub portion. As the pulley assembly is rotated, it advances a rod within a continuously variable transmission. The rod adjusts the power adjusters as described above. Alternatively, the rod does not translate along its long axis, instead it rotates about its long axis and threads on one end of the rod move translate a nut coupled to the power adjusters.

The grip portion is also unique in its display of information to the rider. A CVT does not have a "gear". Yet the average rider is conditioned to think in terms of riding in a particular gear, for example, fourth gear. Instead, with a CVT it is important for the user to think instead of the ratio between the input (the pedal rotation) and the output (the rear wheel rpm). So, the grip portion includes a display showing the ratio. The display also includes a filament that curves as the ratio is adjusted. A high ratio renders the filament flat, and indeed this ratio is appropriate for riding on a relatively flat surface. The filament takes on a steep curve as the ratio is adjusted to make riding up hills easier. The display can also be electronic (LED, OLED, LCD). Also, the curve or flatness of the indicator can be designed to best inform the rider.

The grip portion includes a grip pulley that spools a pair of cables that are used to advance and retreat a pair of cables that adjust the CVT. The grip pulley also includes a gear portion that engages the display discussed above. The grip pulley includes helical cable take-up grooves. This allows for an even amount of cable take-up with each rotation of the grip.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 9 to 15 also provide various views of the pulley assembly and its interaction with the cables and the CVT.

DETAILED DESCRIPTION OF THE DRAWINGS

Figure 1:
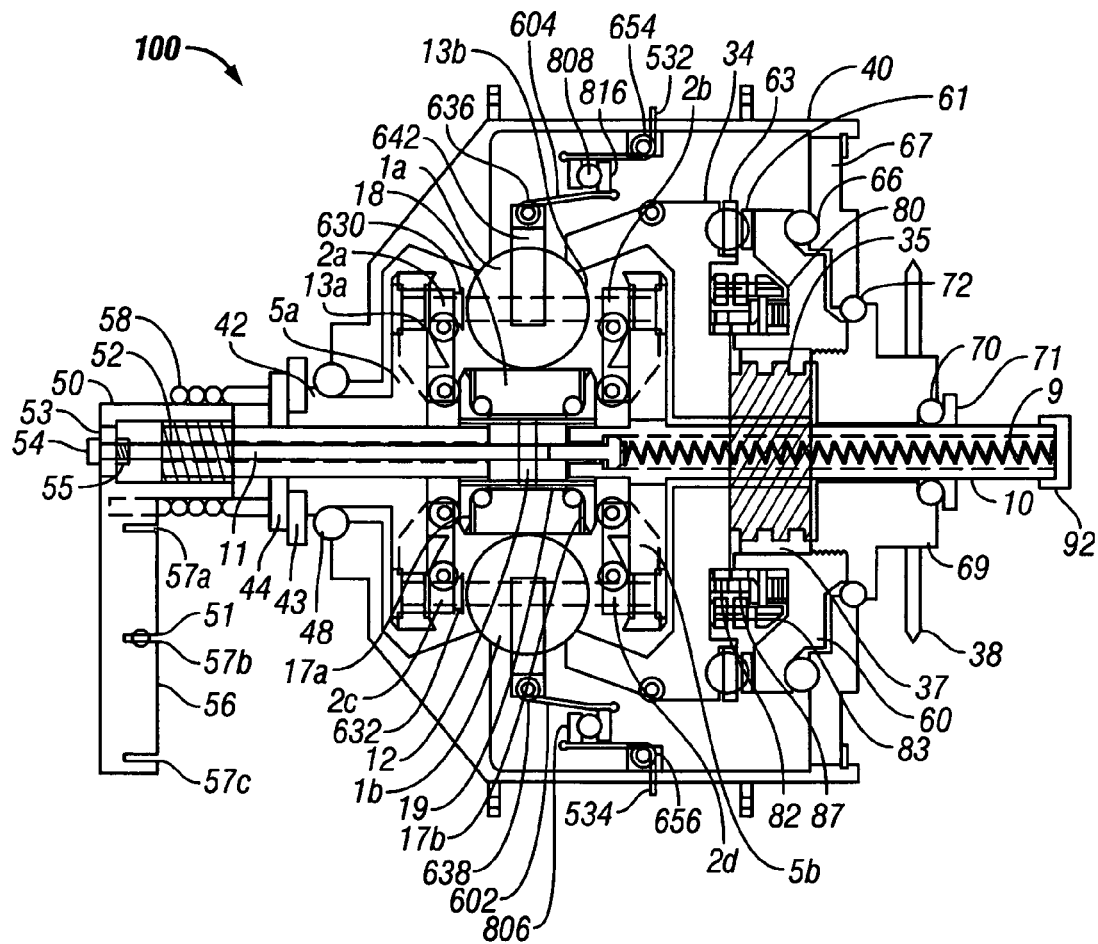
FIG. 1 is a sectional view across the prior art continuously variable transmission.
Figure 2:
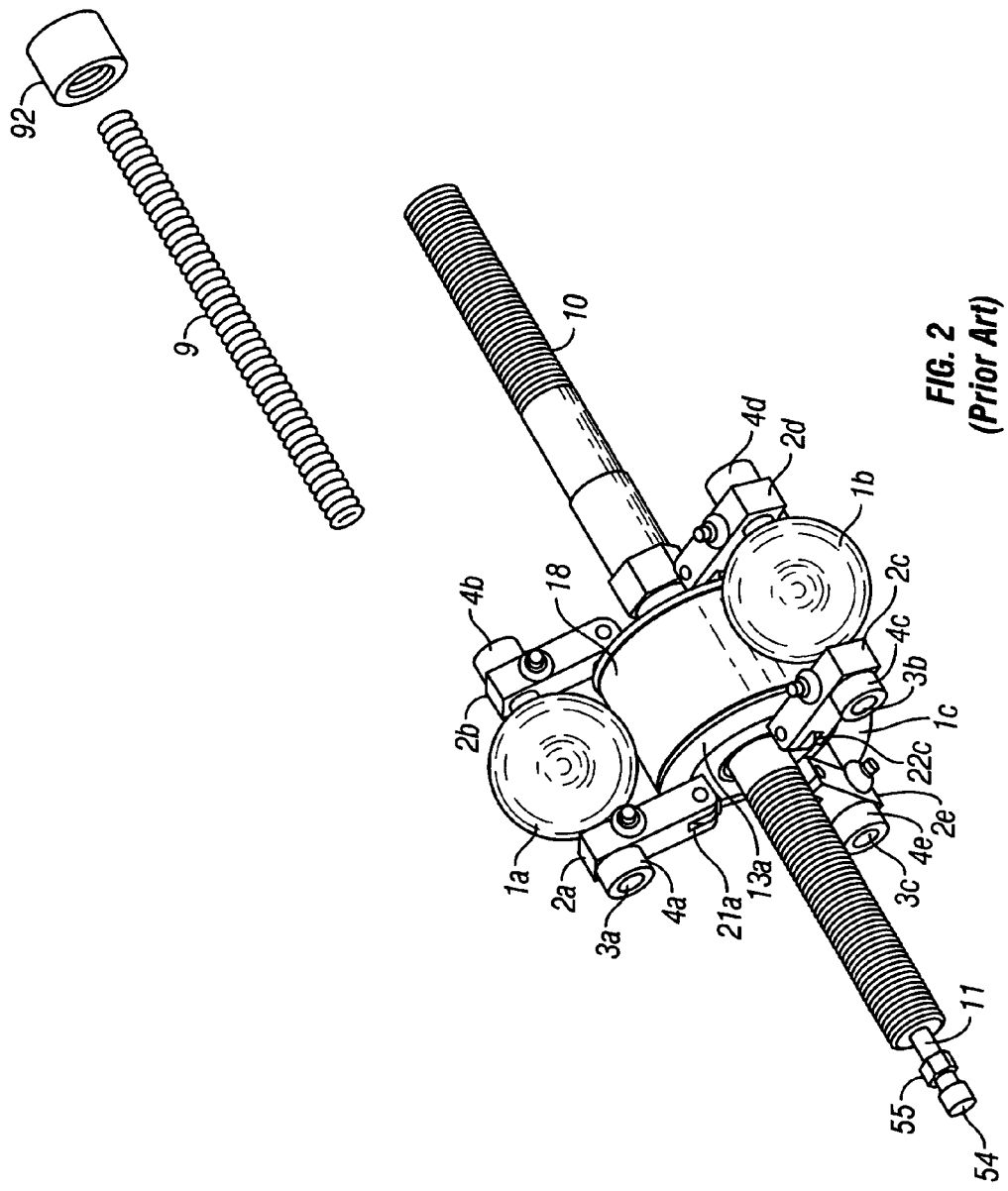
FIG. 2 is an exploded view showing the transmission "power adjusters" of the prior art.
Figure 3:
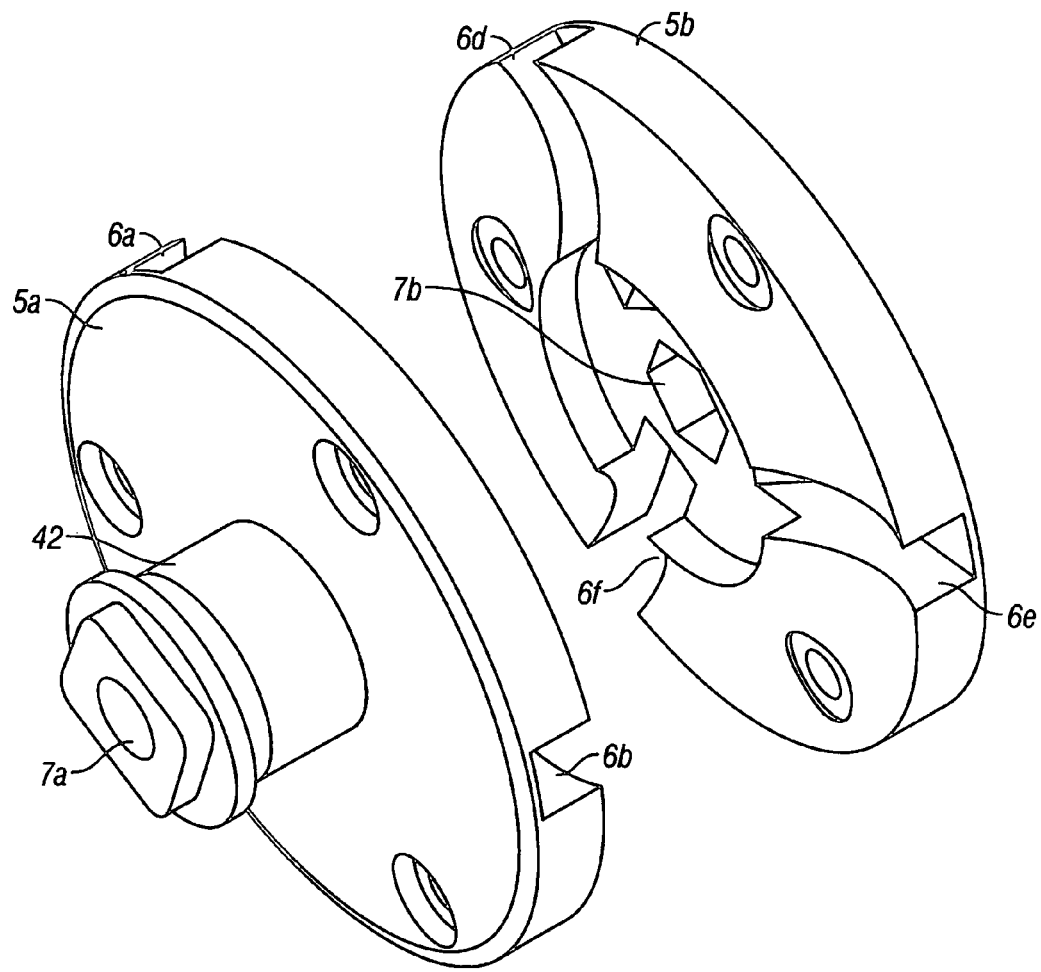
FIGS. 3 and 4 illustrate other components in a prior art continuously variable transmission.
Figure 4:
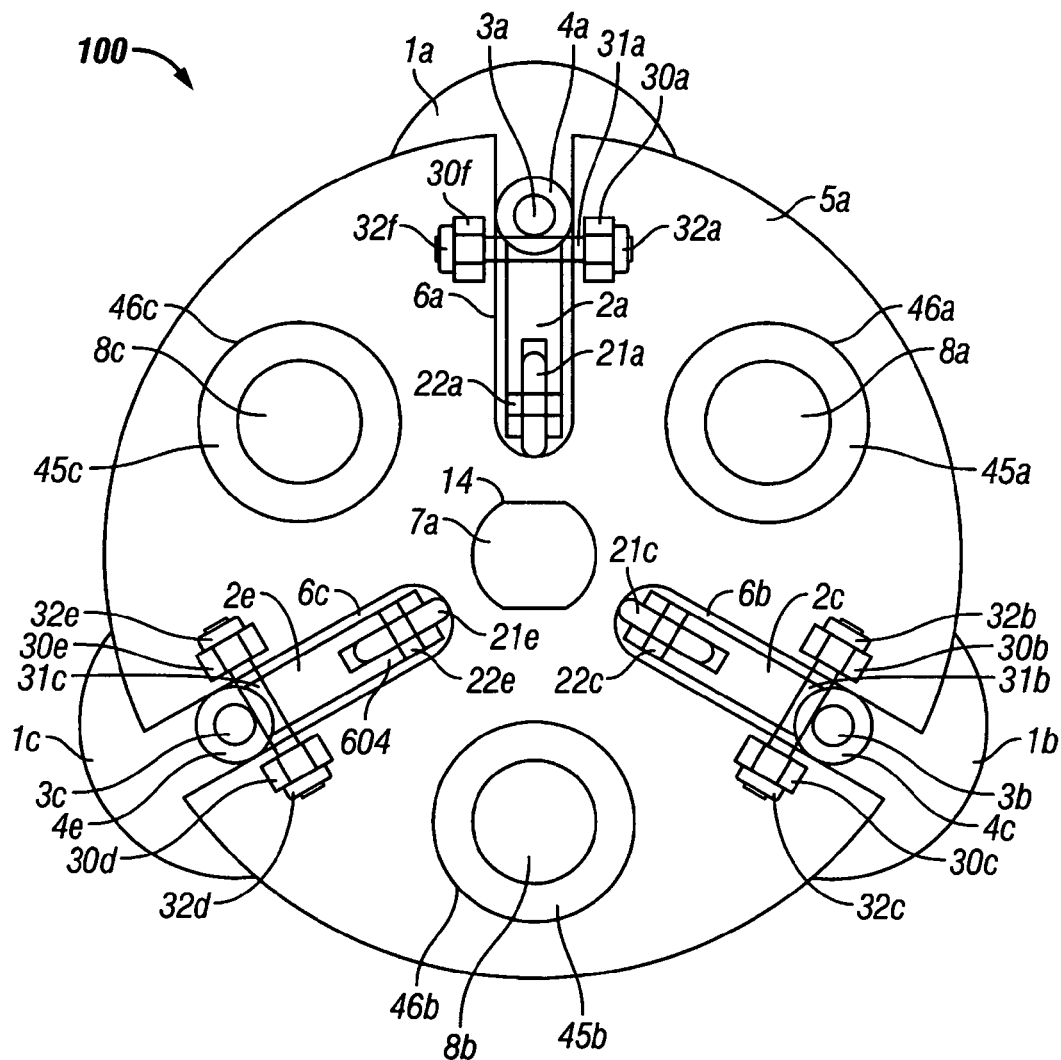
Figure 5:
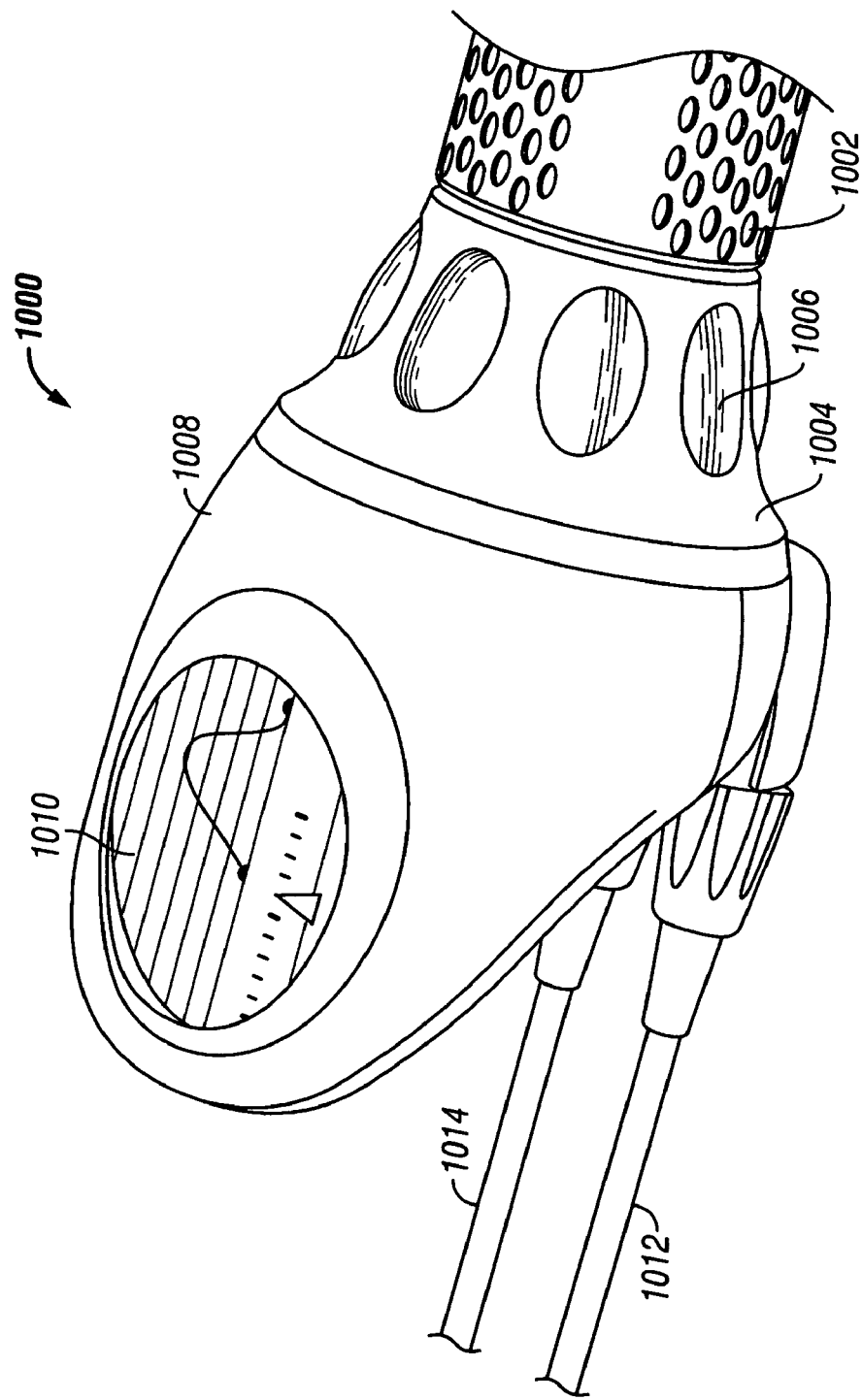
FIG. 5 illustrates the grip portion of a shifter embodying the present invention.

A shifter for a bicycle is disclosed in FIG. 5 that embodies one embodiment of the present invention. The shifter has two portions, a rotatable hand grip 1000 located on the handle bars of the bicycle and a hub 1100 located near the axle of the rear wheel. The grip 1000 is also known as the ratio controller.

While riding the bicycle, the rider will grip cover portion 1002. As the rider encounters steeper terrain, he will want to alter the transmission ratio so that more rotations of the pedals (the input) produce fewer rotations of the rear wheel (the output). To alter this transmission ratio, the user will rotate the adjuster 1004. The adjuster 1004 can include several indents to assist the rider. A unique element of the shifter is a visual display 1010 of the input/output ratio. This is located on a housing 1008. A filament is attached to the display 1010. This could also be depicted by using an OLED, LED or LCD Display. As the indicator moves from left to right the filament changes shape from a flat line when all the way to the left to a curved line when all the way to the right. This visually represents the transmission ratio in relation to the terrain. If the rider is on flat roads the indicator is all the way to the left (flat line) which sets the transmission to the highest ratio. When the rider is climbing a hill the indicator is all the way to the right representing a hill (curved line) which sets the transmission to the lowest ratio. The indicator translates back and forth across the visual display 1010 face and is controlled by a lead screw driven by the adjuster 1004. The scale is preferably from 0 to 100%, but any scale could be used Because this is a Continuously Variable Transmission, there is not a specific "gear", e.g. fourth gear. In another embodiment the scale can read from 0 to 350% or may have an image of a flat road at one extreme and an image of a hill at the other extreme. Another embodiment would have an image of a rabbit at one extreme and an image of a turtle at the other extreme.

Figure 6A:
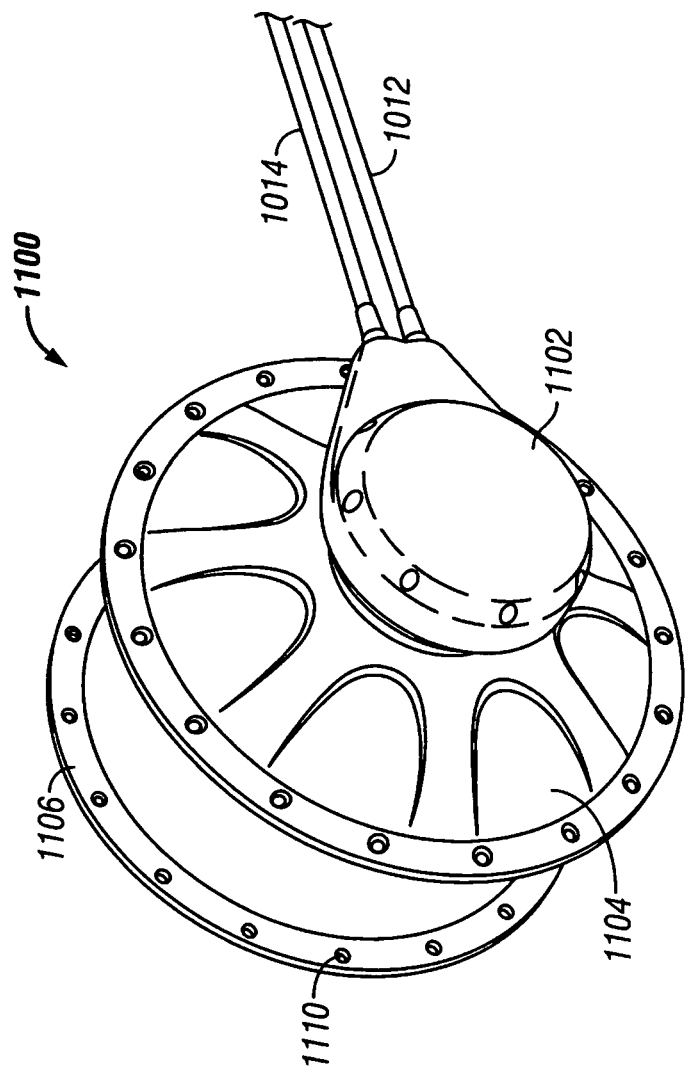
FIG. 6a illustrates the hub portion of a shifter embodying the present invention.

FIG. 6*a* illustrates the rear hub 1100. The rear hub 1100 includes a housing 1102 that encloses and protects a pulley system coupled to cables 1012 and 1014. The hub is also coupled to a continuously variable transmission in housing 1104. The CVT can be a type similar to the Fallbrook Technologies CVT described above, or could be any suitable design that allows for the adjustment of the power adjusters. The housing 1104 should be relatively compact to fit concentrically with the axle of the rear wheel. Various mounting holes 1110 can be provided on the housing to facilitate torque transmission from the hub shell.

Figure 6C:
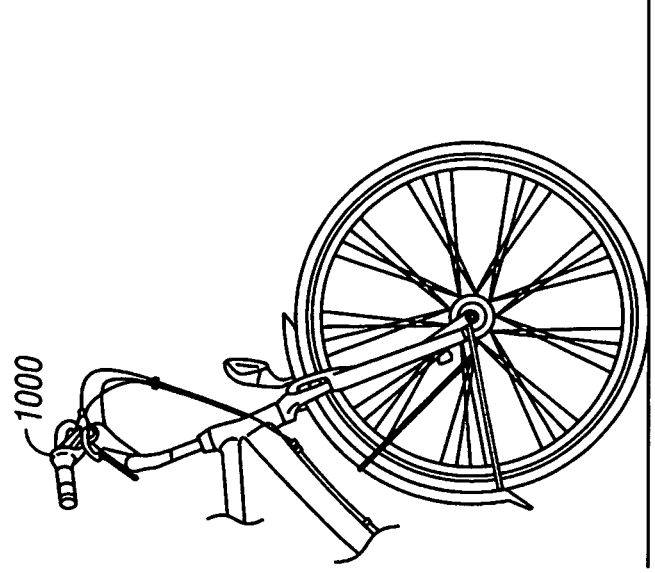
FIG. 6c illustrates a portion of a bicycle showing the location of the grip portion
Figure 6B:
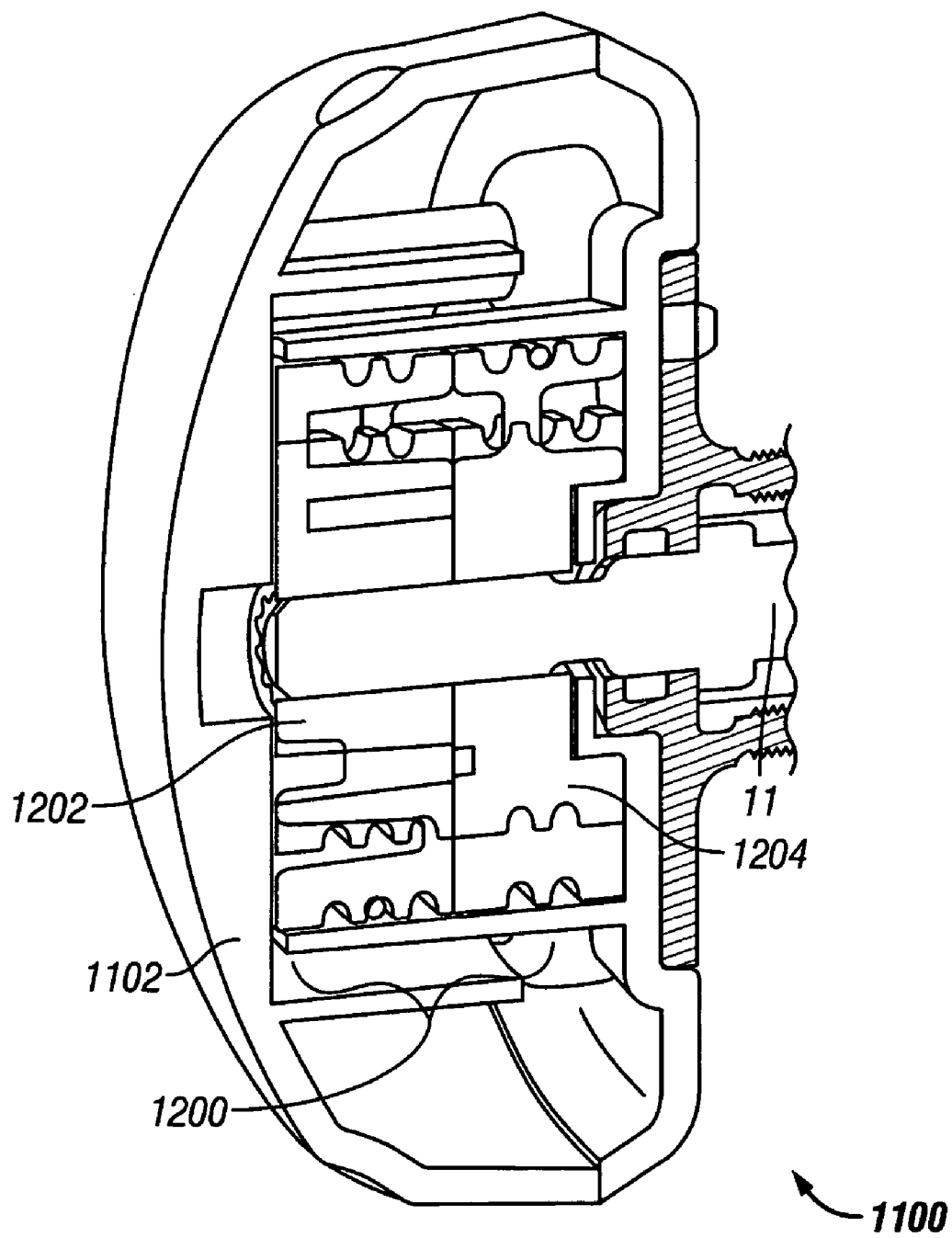
FIG. 6b is a sectional view of the hub portion.

FIG. 6*b* is a sectional view across the pulley assembly 1200 located in the hub 1100. It includes a pair of pulleys 1202 and 1204. First cable 1012 is attached to the first pulley 1202 so that a tension on the cable 1012 causes the pulley to rotate. Upon rotation, in one embodiment, a rod 11 located axially with the pulleys 1202, 1204 rotates about its longitudinal axis. In such embodiments, the pulleys 1202, 1204 are typically configured with a splined central bore adapted to couple to a complimentary splined portion of the shift rod 11. The shift rod 11 is then suitably axially constrained to or by components (not shown) of the CVT 100. As discussed above, an alternative embodiment of the CVT 100, the rod is merely translated axially by the pulleys. In such alternative embodiments, the pulleys 1202, 1204 typically include a threaded central bore adapted to couple to a complimentary threaded portion of the shift rod 11. In these latter alternative embodiments, the pulleys 1202, 1204 are suitably constrained axially, and the shift rod 11 is suitably constrained rotationally.

FIG. 6*c* provides an illustration of a typical bicycle that includes the present shifter. The grip portion 1000 can be located on the handle bars. However the shifter could also be located on or around any tubular structure on the bicycle.

Figure 7:
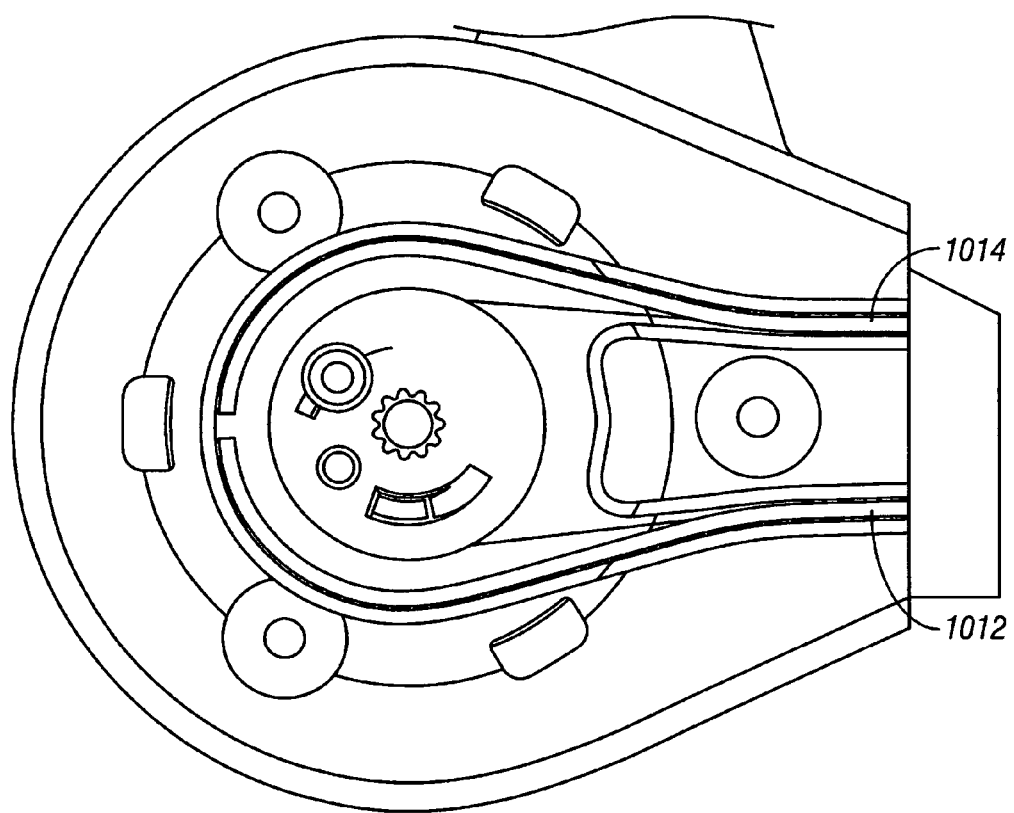
FIG. 7 is a side view showing the pulley system used.

FIG. 7 shows the interaction between the cables 1012 and 1014 and the pulleys. Each cable is terminated into either pulley 1202 or 1204. As the adjuster 1004 is turned clockwise or counterclockwise, one cable is tensioned and rotated. Rotation of the pulleys produces a translation in rod 11 thereby shifting the CVT. In an alternative embodiment, rotation of the rod produces movement of a nut within the CVT assembly, wherein the movement of the nut adjusts the contacts with the force transference balls. The pulley 1202 has an internal spline that interfaces with an external spline of rod 11. Pulley 1204 is connected to pulley 1202 by means of a protruding nub on 1202 that is received into a recessed pocket on 1204 and secured with screw 1230. Another embodiment is possible to have a single pulley incorporating the splined interface to rod 11.

Figure 8A:
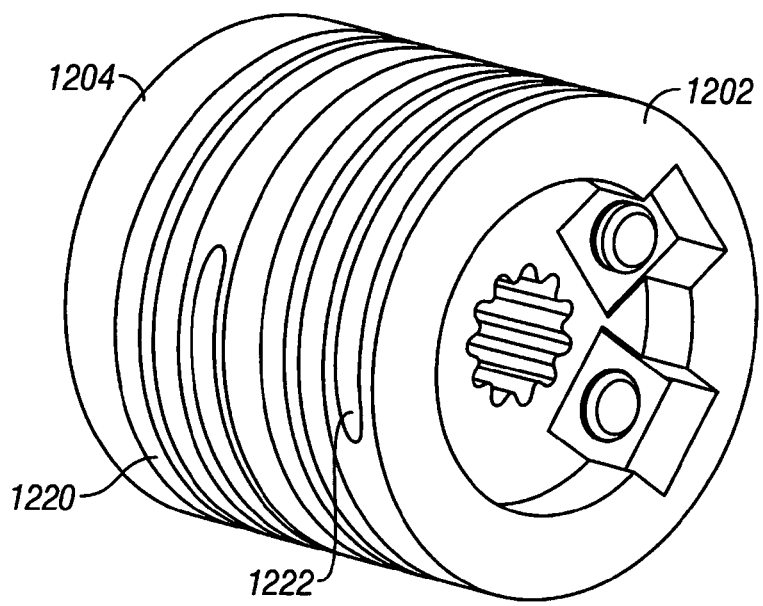
FIGS. 8a, 8b, and 8c provide an exploded view of the pulley system within the hub.
Figure 8B:
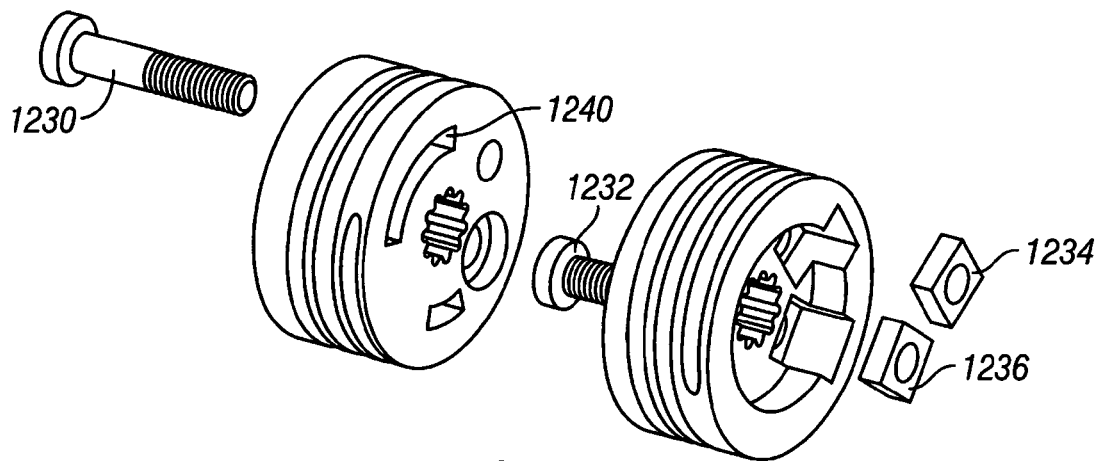
Figure 8C:
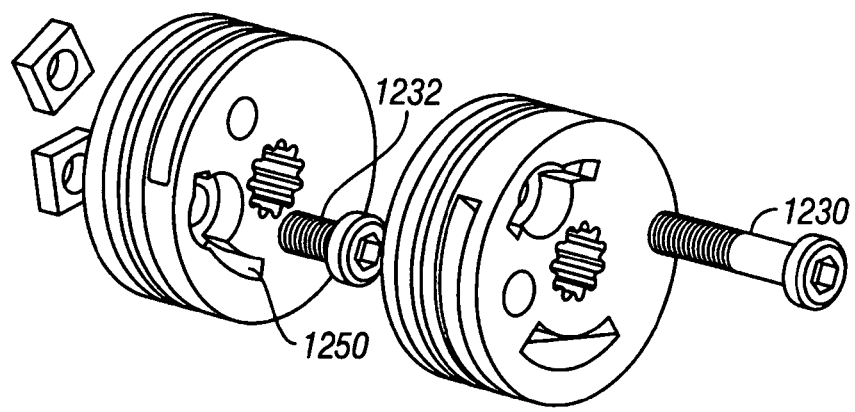

FIGS. 8*a*, 8*b* and 8*c* illustrate the two pulleys 1202 and 1204 in greater detail. In each case, there is a pronounced helical groove, 1220 and 1222 respectively, that allows the cables to spool around the pulleys. In known pulleys, the pulley cable typically tends to wrap around itself and, thereby, change the effective diameter of the pulley. During operation of the known pulleys, as the cable wraps and unwraps, often a certain amount of slack is developed in the cable. When changing rotation of the pulley from one direction to another, the slack manifests itself as backlash or a dead spot. The helically grooved pulley prevents the cable from wrapping around itself and, hence, eliminates or reduces backlash. Each pulley can also have a splined central channel that accepts the proximal end of the rod 11 (not shown). In this embodiment, only pulley 1202 is splined. The pulleys 1202 1204 act dependently on each other. Bolt 1230 is used to couple the pulleys together using nuts 1234 and 1236. In another embodiment, bolt 1230 is threaded directly into pulley 1204 Slots 1240 and 1250 accept the ends of the cables 1012 and 1014 respectively. The head of bolts 1230 and 1232 are tightened against cables 1012 and 1014 respectively, trapping cables 1012 and 1014 against pullies 1202 and 1204.

Figure 9:
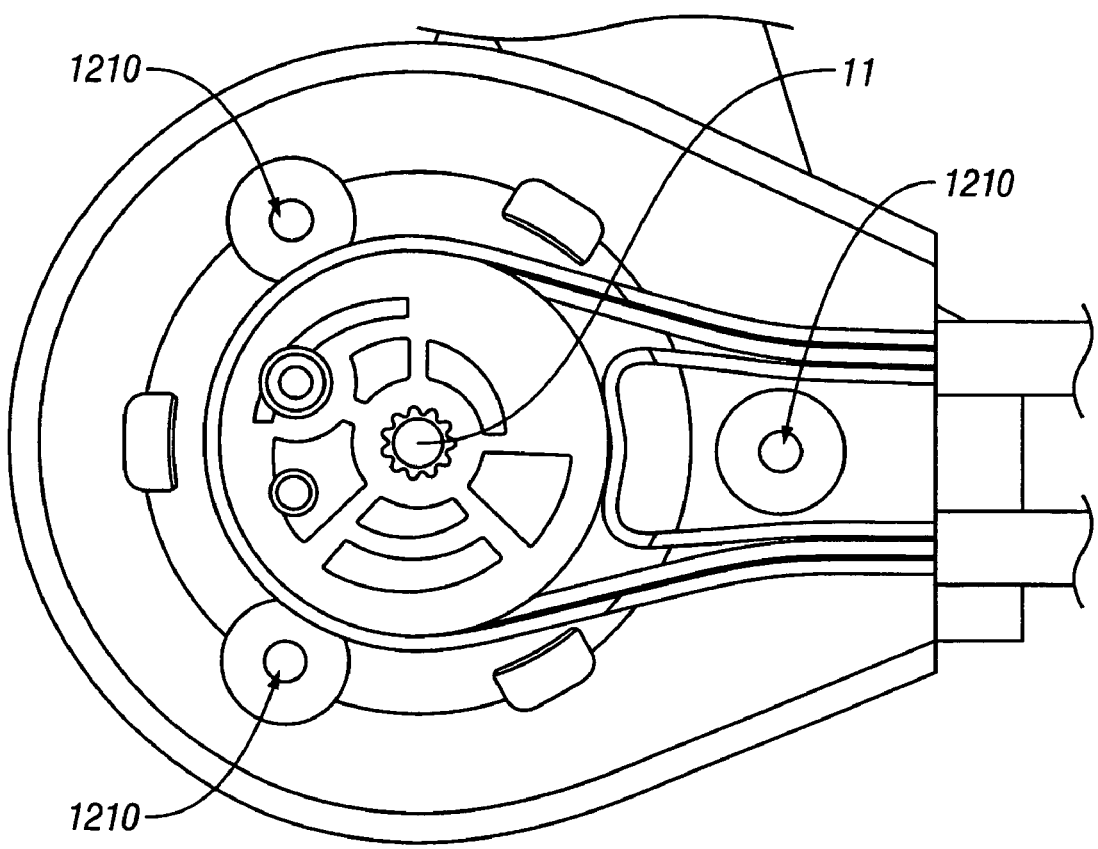
Figure 10A:
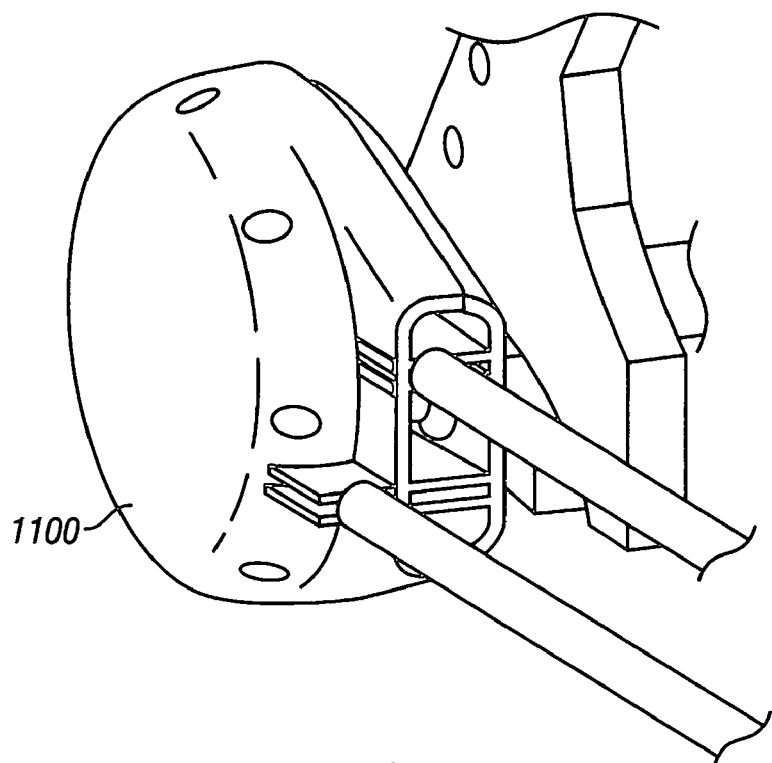
Figure 10B:
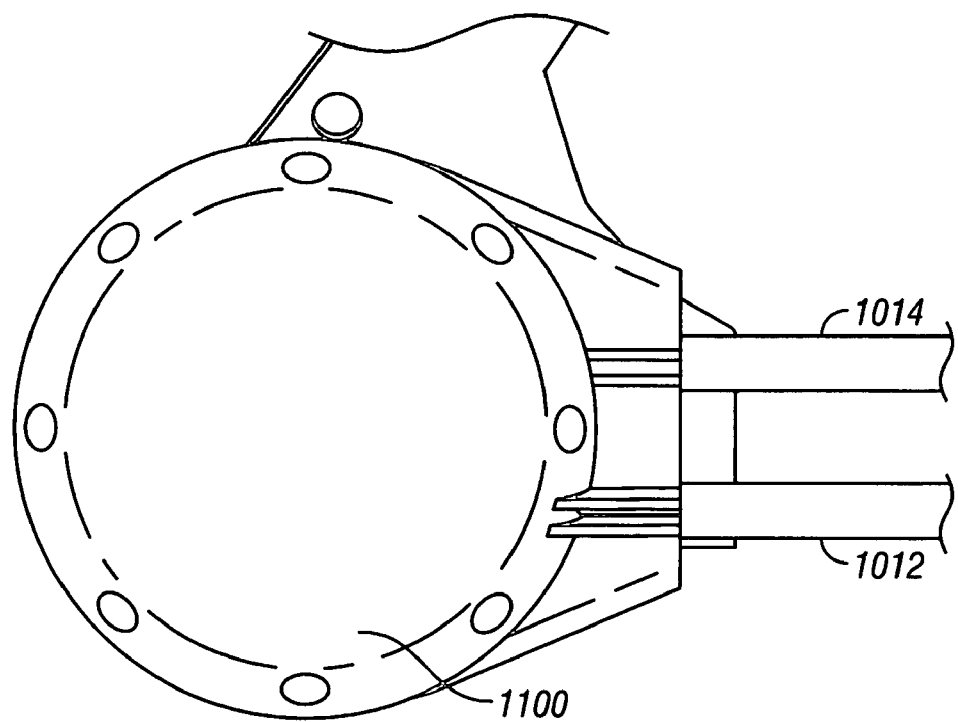
Figure 11A:
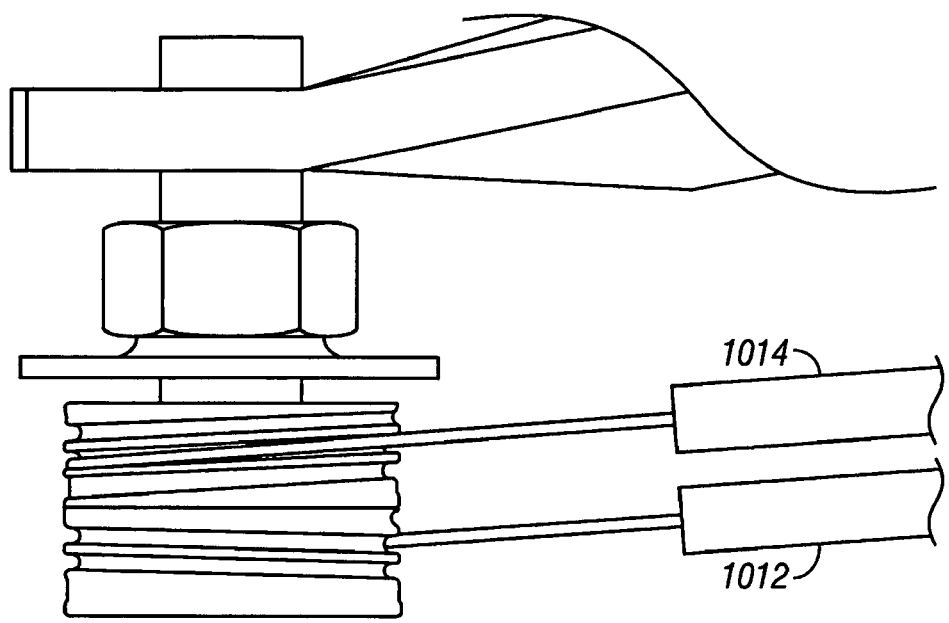
Figure 11B:
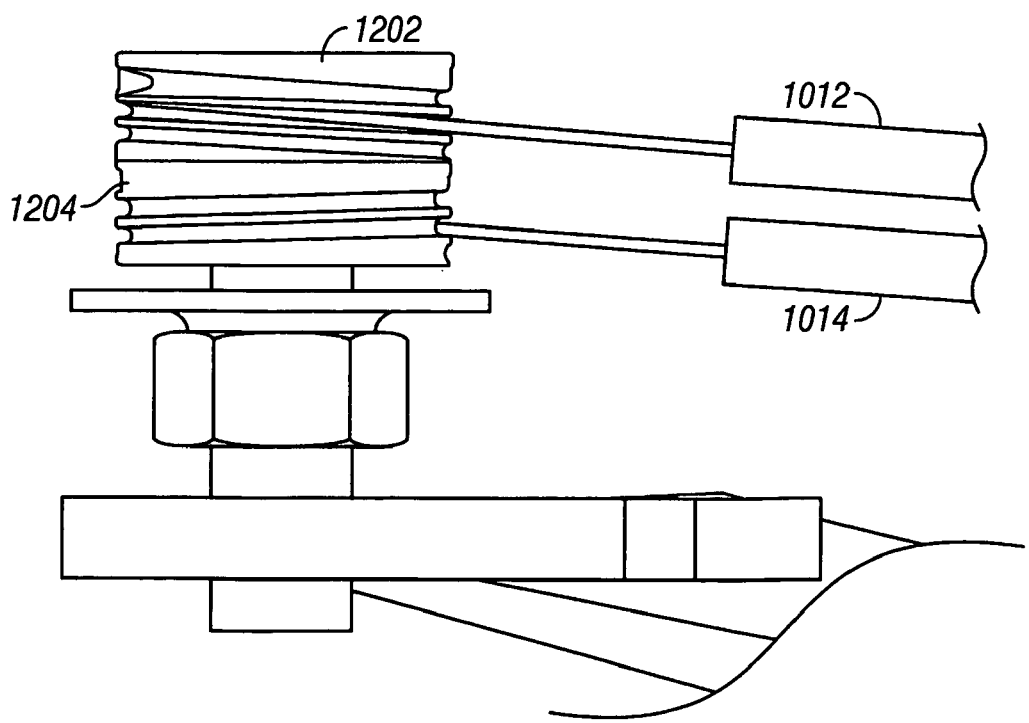
Figure 13A:
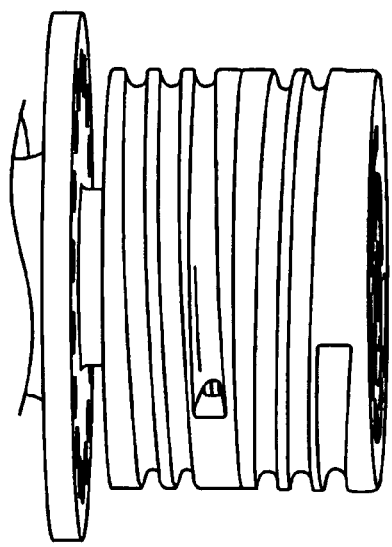
Figure 13B:
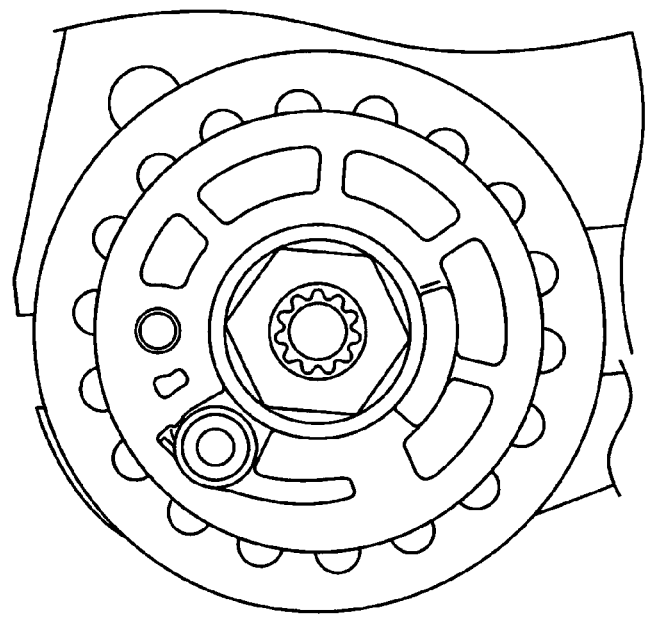
Figure 13C:
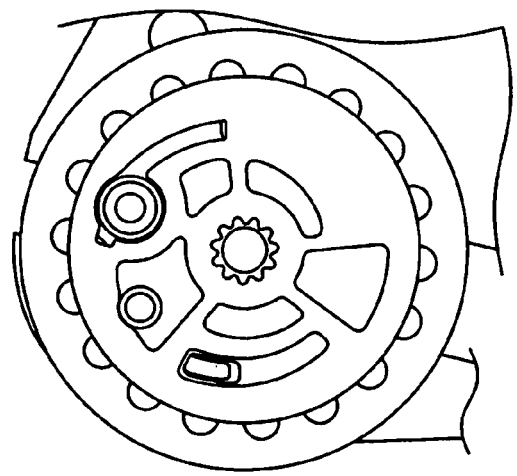
Figure 14A:
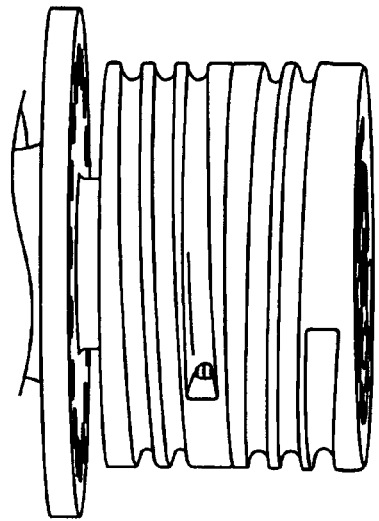
Figure 14B:
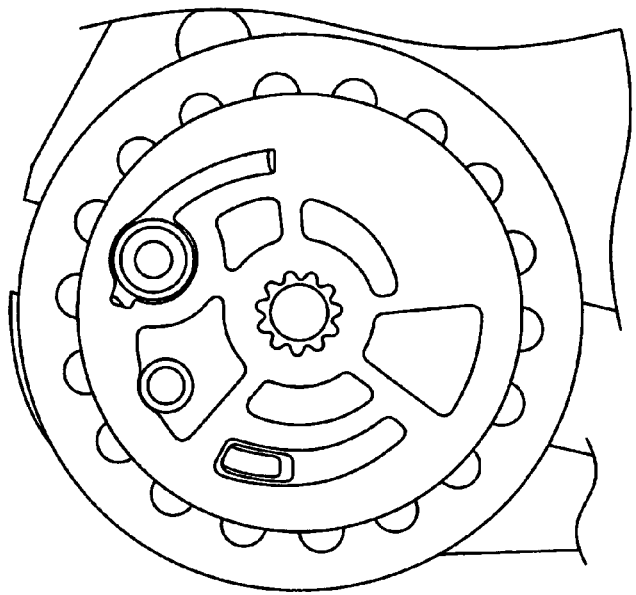
Figure 14C:
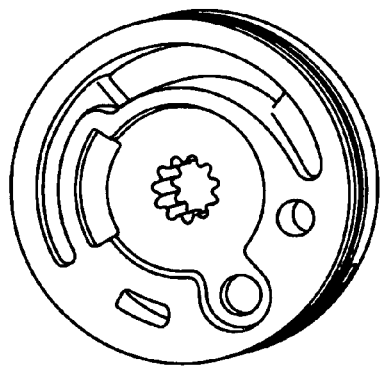

FIG. 9 provides an interior side view of the hub. Cables 1012 and 1014 enter the hub as shown. The cables can be shielded with covers to that prevent any debris from jamming the travel of the cables. Bosses 1210 are bosses that plastite screws are driven into to attach cover 1104 to the rear cover. FIGS. 10*a* and 10*b* provide perspective views of the hub 1100 as it engages the rear axle of the bicycle. Note that the cables have a slight lateral offset to each other. FIGS. 12*a* and 12*b* illustrate the connection between the hub portion of the present shifter with the outer input disc for the CVT. Likewise, FIGS. 13*a*, 13*b*, and 13*c* provide additional detail showing the pulleys engaged adjacent to a portion of the CVT. Note that the pulleys rotate independently from the CVT. The sole purpose of the pulleys is to rotate or translate the adjustment rod that penetrates the CVT. FIGS. 14*a*, 14*b* and 14*c* also provide additional detail of the pulleys. 13*b* illustrates pulley 1204 as installed while 14*b* illustrates the assembly of 1202 and 1204 as installed. In 13*b* we should make note that the ID of 1204 is piloted on the outer diameter of a lip on the back cover which isn't numbered.

Figure 15A:
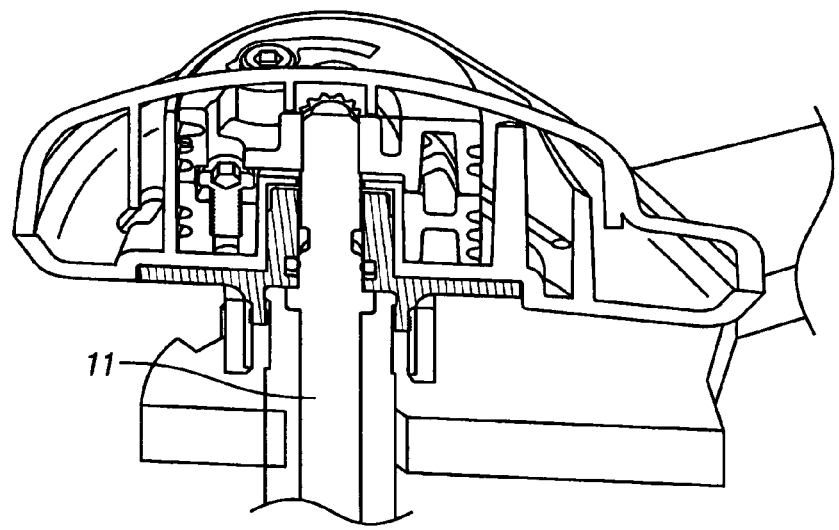
Figure 15B:
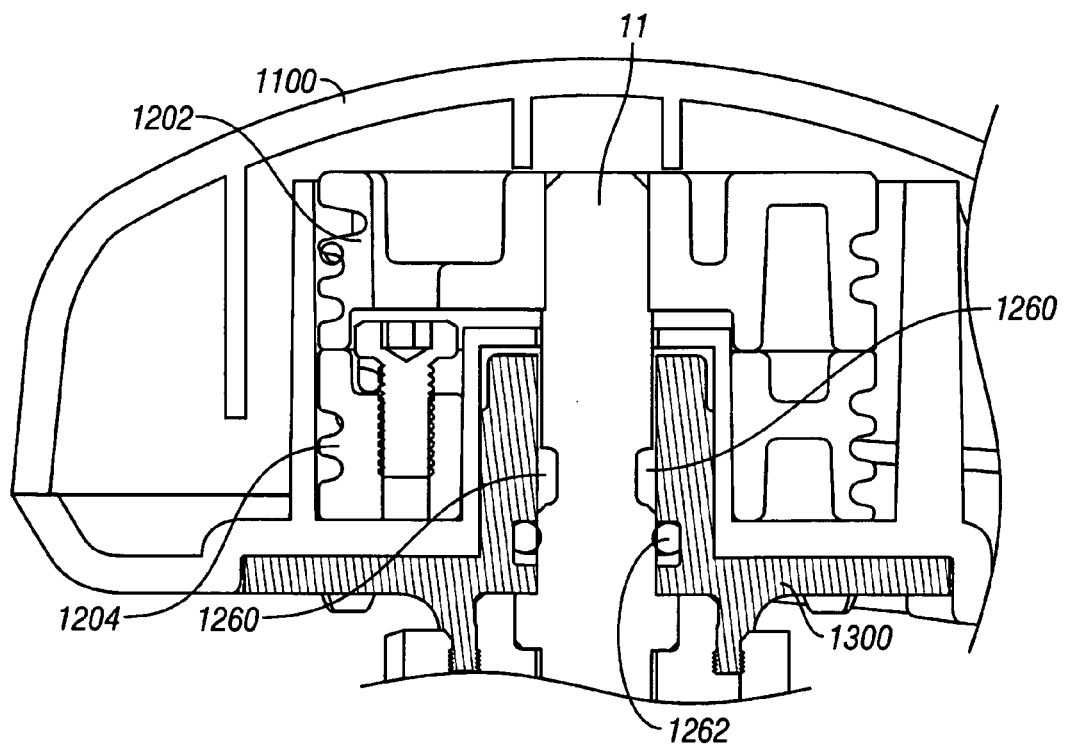

FIGS. 15*a* and 15*b* provide useful sectional views across the side of the hub 1100. The case around the hub portion 1100 engages the shift nut 1300. Shift nut 1300 acts as the back cover of the hub. The nut 1300 has a series of holes that match a series of pins on the back cover that perform two functions. The first is that they anchor the hub to the bicycle frame preventing the hub assembly from rotating counter to the cable pull. The second is that they permit the hub to be oriented at various angles to the bicycle frame allowing for variation in frame geometry. This is important because the user will want to route cables 1012 and 1014 along the frame in the optimum path.

Figure 16:
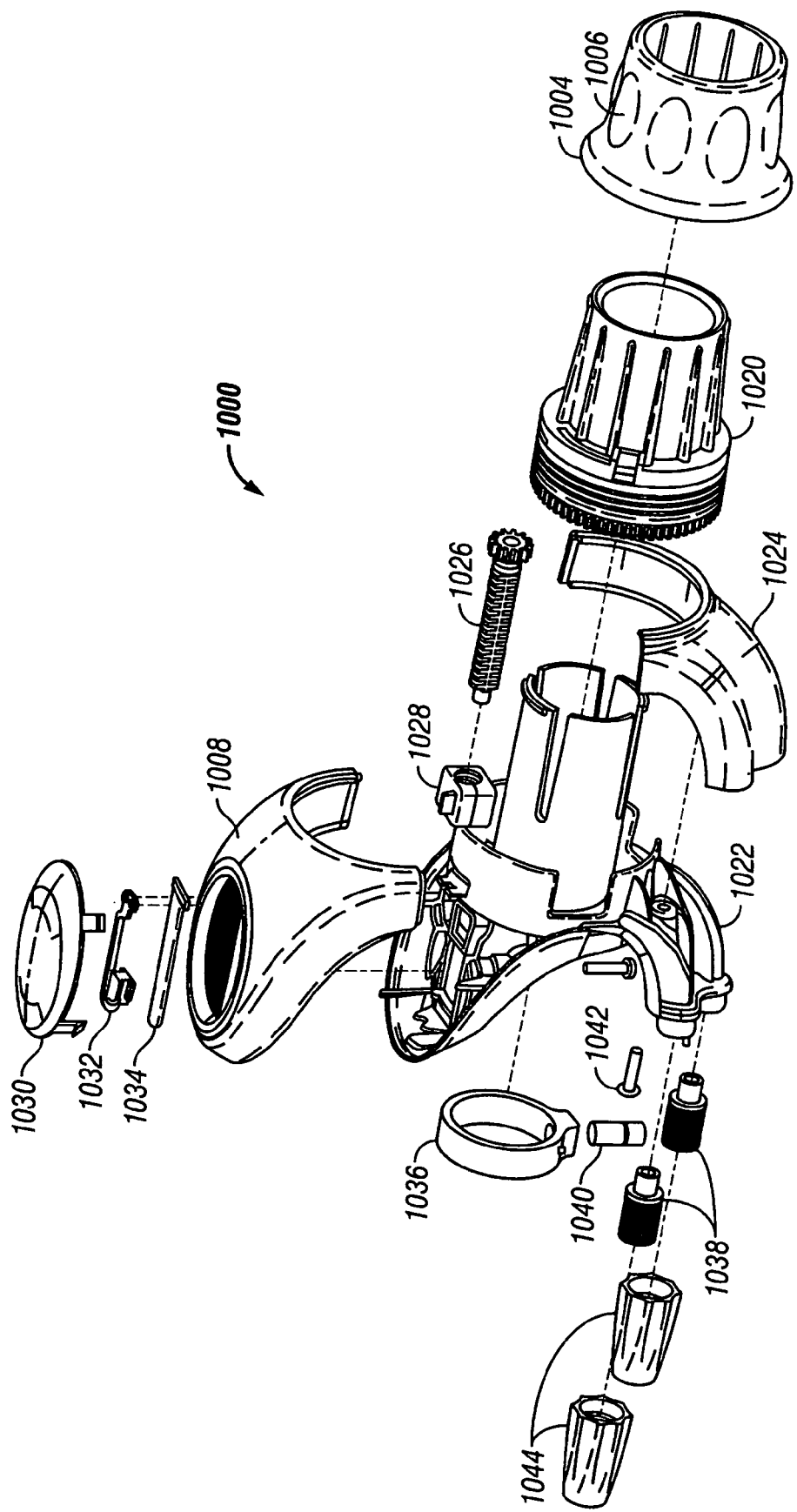
FIG. 16 is an exploded view of the grip portion of the present invention.

FIG. 16 is an exploded view of the grip portion 1000 of the present invention. The grip portion has an inner case 1022 that forms the underlying structure of the grip portion. The inner case 1022 has a central section designed to fit securely over the end of a handlebar. A grip pulley 1020 fits over an elongated section of the inner case 1022. The grip pulley 1020 serves several purposes. The first is to control the advancement and retraction of a cable(s) used in the hub portion of the invention. A pair of cable grooves is located on the outer surface of the grip pulley to facilitate cable management. Also, the grip pulley includes a gear on one end that engages a lead screw. Thus, as a user adjusts the grip portion 1000, the underlying grip pulley 1020 advances both a cable and the lead screw.

A grip 1006 covers the grip pulley and provides an improved surface for the user to grip. The inner housing is enclosed by a top case 1008 and a bottom case 1024. A clamp 1036 prevents the movement of the grip portion 1000 a pair of barrel adjusters 1044 and threaded inserts 1038 guide the cable into the inner housing and to the grip pulley. The user interface for the grip portion includes the scale 1034, indicator 1032 and lens 1030 that are mounted in the upper housing 1008. Various screws 1040, 1042 are used to hold the assembly together.

Figure 17:
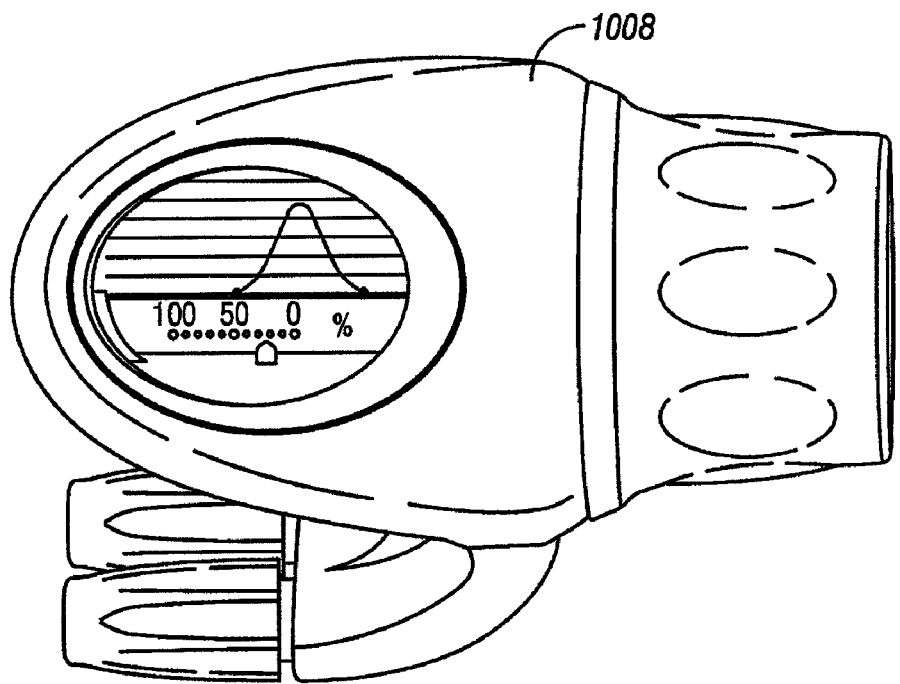
FIGS. 17 and 18 provide additional detail of the indicator element.
Figure 18:
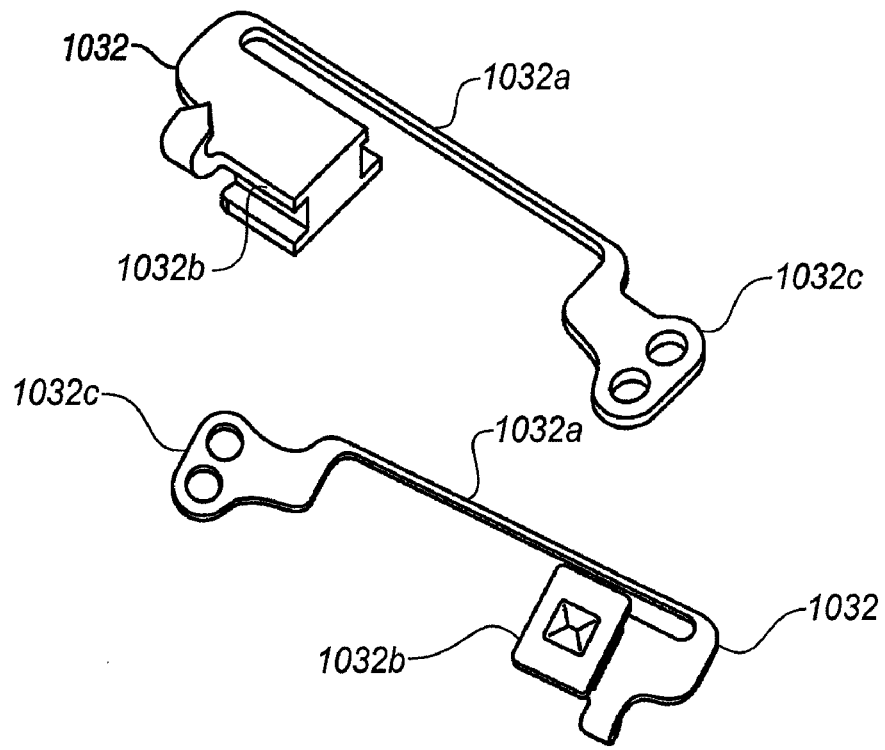

FIGS. 17 and 18 provide a more detailed view of the indicator. The top case 1008 is curved to prevent any possible injury to the rider. Preferably, the top case 1008 is also a different color than the indicator 1032 or scale 1034. This enhances the contrast and visibility of the indicator 1032 to a rider, even in low light conditions. The indicator 1032 is preferably a bright yellow or orange color. The indicator 1032 has a first end 1032b and 1032c, and a flexible portion 1032a. The first end is characterized by an arrow used to point to a value on the scale 1034. Further, the first end engages the nut 1028, so that as the nut advances or retreats along the lead screw, the arrow moves left and right along the scale. During movement of the nut 1028, the flexible portion 1032a of the indicator also curves upward. The second end 1032c is characterized by at least one hole to engage a fixed peg on the inner case 1022.

Figure 19:
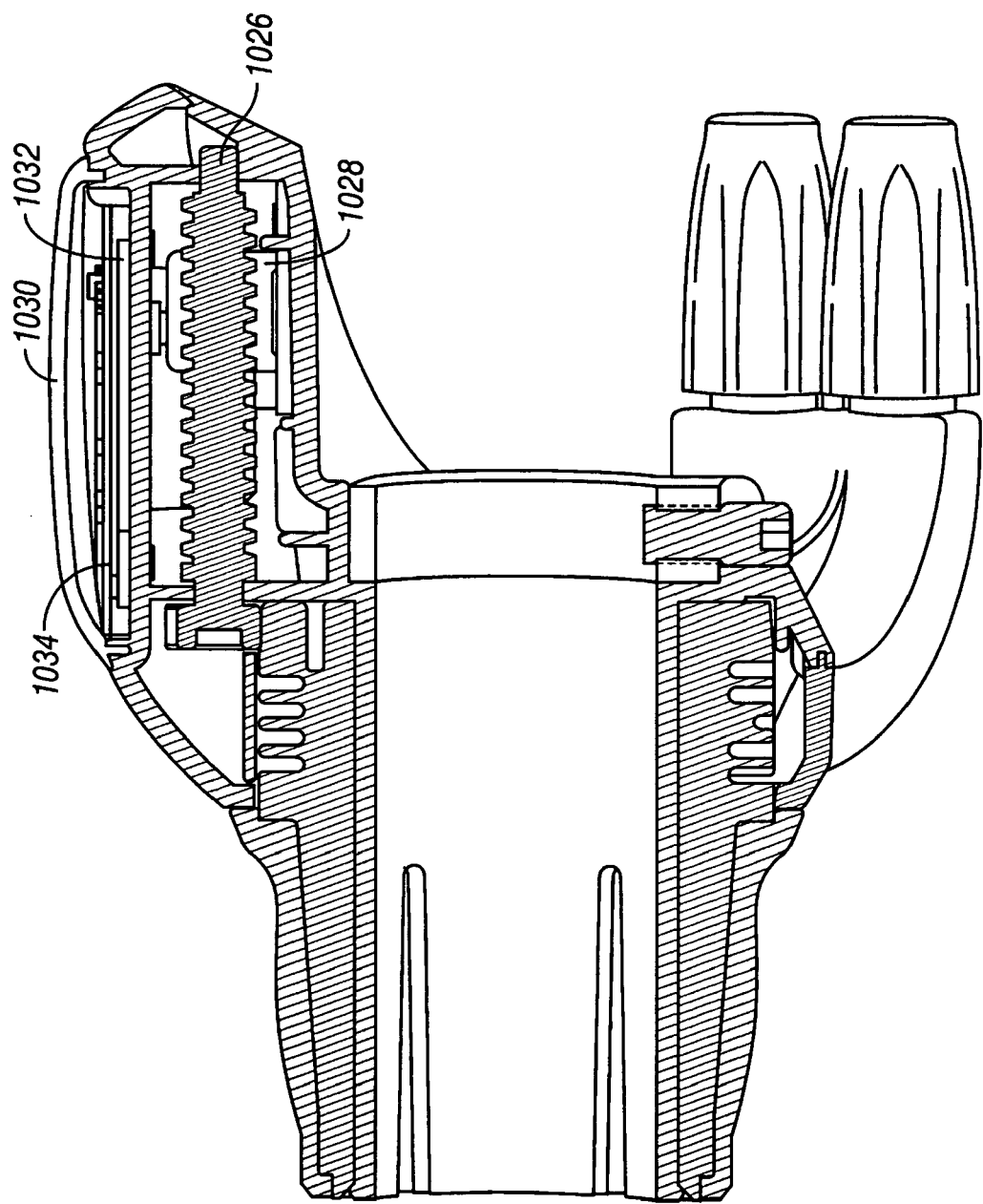
FIG. 19 is a side sectional view showing the lead screw used to adjust the indicator.

FIG. 19 is a side sectional view showing the lead screw 1026 used to adjust the indicator. The following nut 1028 is threaded over the lead screw 1026 during the assembly of the grip portion. A rib 1022b on the inner case 1022 is a reference point to ensure that the nut is screwed on the correct distance. The lead screw 1026 is suspended between additional ribs 1022a and 1008a on the top case 1008. The ribs engage a smooth diameter of the lead screw and not its threaded portion.

Figure 20:
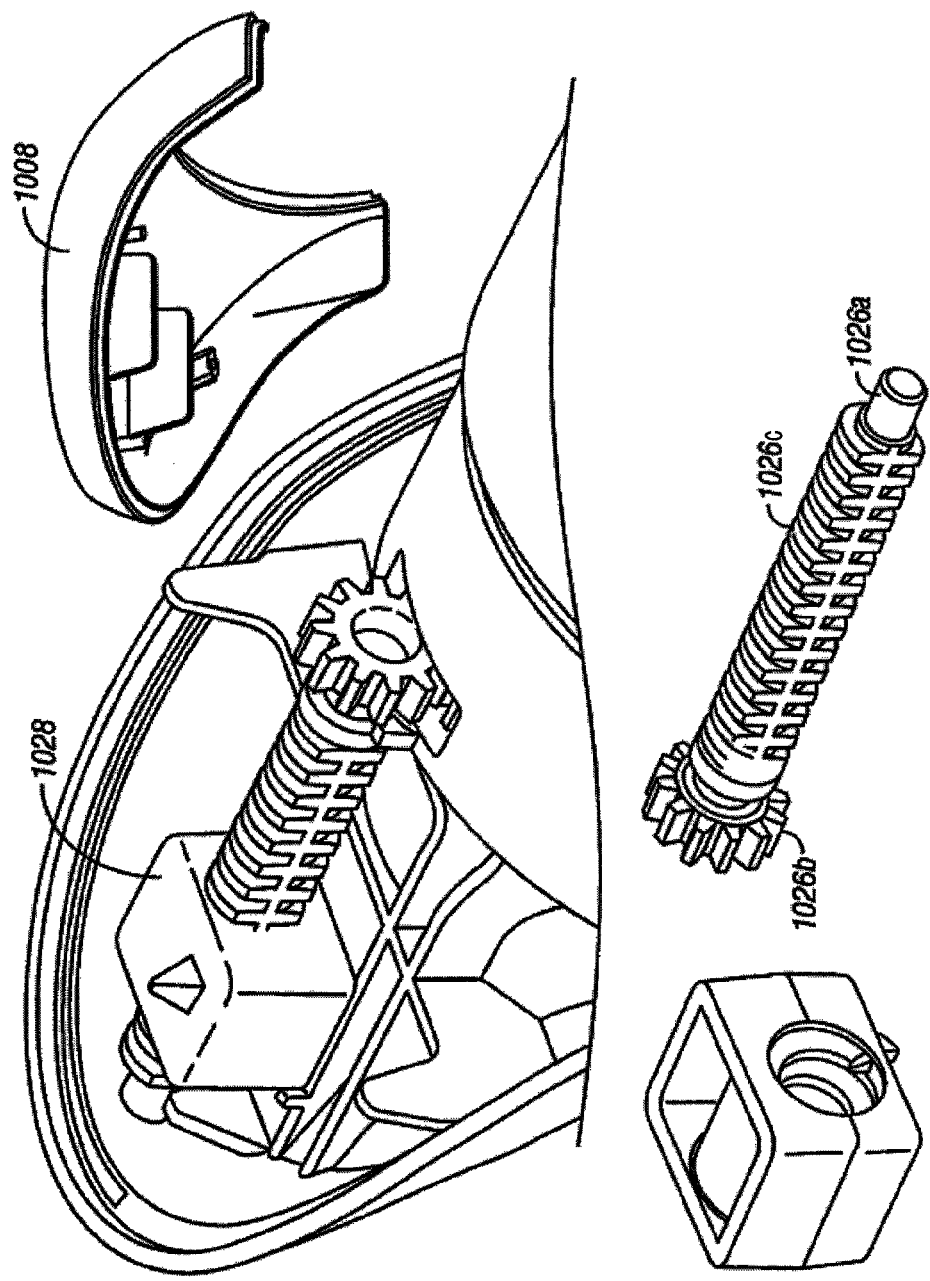
FIG. 20 provides additional views of the lead screw and the nut used to adjust the indicator.

FIG. 20 provides additional views of the lead screw 1026 and the nut 1028 used to adjust the indicator. The lead screw has a geared portion 1026b that engages the similarly geared portion of the grip pulley. It also has a tip portion 1026a that is captured between the inner case and the top case so that the lead screw can rotate freely. The threaded portion 1026c of the lead screw provide the means for the nut 1028 to advance and retreat. In one embodiment, the threads are spaced at 12.5 threads/inch, however any appropriate thread spacing, angle or shape could be used. The nut 1028 has a mating thread pattern around an inner circumference. Additionally, the nut 1028 has a protruding feature that fits into a recess on indicator 1032. This feature drives the indicator while allowing for ease of assembly.

Figure 21:
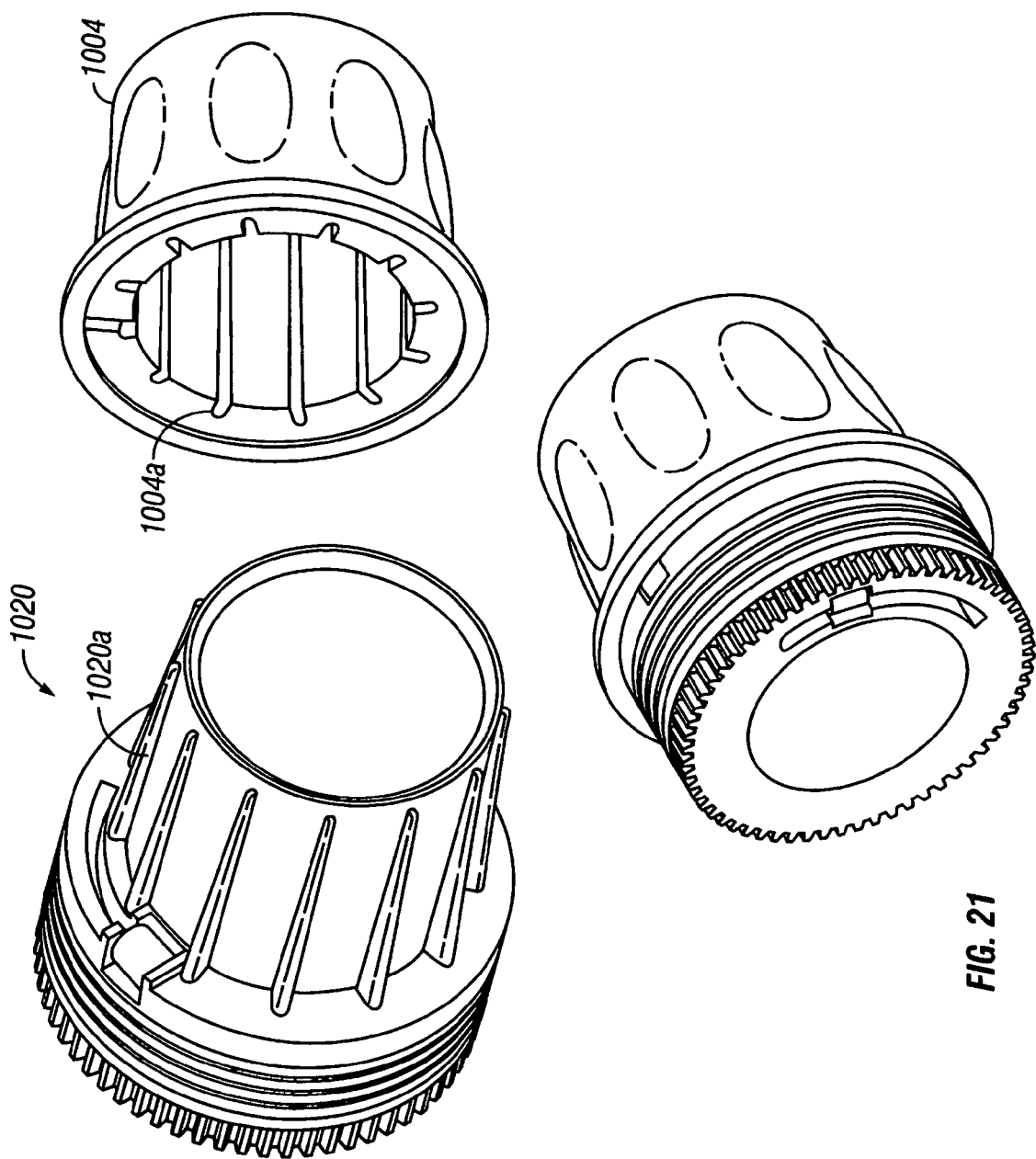
FIG. 21 provides more detailed perspective views of the grip pulley.

FIG. 21 provides more detailed perspective views of the grip pulley 1020. The grip pulley serves several purposes. The first is to provide cable take-up for the first and second cables. The cables track into a pair of helical grooves. The two cables insert into recessed grooves on either end of the helical groove. Ferrules on the end of each cable are used to secure the cable in place. As the grip pulley is turned, one cable is placed under tension and retracts into the groove 1020c. Gear portion 1020b also engages the the geared portion of the lead screw 1026b. A rotation of the grip pulley, thus turns the lead screw, which causes the following nut to move and adjust the indicator.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A shifter for use with a continuously variable transmission (CVT) having a plurality of power adjusters, each provided with a tiltable axis of rotation, the shifter comprising:
a grip portion having a display;
a hub portion coupled to the grip portion by at least one cable; wherein the grip can be rotated to adjust a pulley located in the hub;
wherein the display has a filament that is moveable from a first position to a second position, the filament comprising a flexible member; and
wherein the grip portion further comprises:
an inner case;
a grip pulley engaged over the inner case, wherein the grip pulley is rotatable around the inner case; wherein the grip pulley has a geared portion; and
a lead screw also having a geared portion for mating with the grip pulley;
wherein the filament is coupled to the lead screw by a following nut.

2. The shifter of claim 1 wherein the grip portion comprises an adjuster coupled to the cable, wherein the adjuster can be rotated to adjust the tension on the cable.

3. The shifter of claim 1 wherein the hub comprises a case, wherein the pulley located in the hub is located within the case.

4. The shifter of claim 3 wherein an adjustment in a tension on the at least one cable rotates the pulley in the hub.

5. The shifter of claim 1 wherein an adjustment of the shifter further adjusts a ratio between an input force and an output force.

6. The shifter of claim 1 wherein the filament has a first end coupled to the nut and a second end coupled to the inner case, so that a movement of the nut produces flexion in the filament.

7. The shifter of claim 1 wherein the grip pulley further comprises a helical groove for cable take-up.

8. The shifter of claim 1 wherein the grip pulley further comprises a cable capture slot for coupling the at least one cable to the grip pulley.

9. The shifter of claim 1 further comprises a top case for covering the indicator.

10. The shifter of claim 1 further comprises a scale for indicating a relative adjustment.

11. The shifter of claim 1 comprises a hub interface back plate that can be positioned at various angles to a vehicle frame while also being rotationally anchored to the vehicle frame.

12. A shifter for use with a CVT on a bicycle comprising:
a grip portion located on a handlebar for the bicycle;
a hub portion coupled to the bicycle adjacent to a rear axle of a rear wheel;
a first cable coupled to the grip portion, the first cable coupled to the hub portion;
a second cable coupled to the grip portion, the second cable coupled to the hub portion; and
wherein the grip portion comprises:
an inner case;
a grip pulley engaged over the inner case, wherein the grip pulley is rotatable around the inner case; wherein the grip pulley has a geared portion;
a lead screw also having a geared portion for mating with the grip pulley; and
an indicator coupled to the lead screw by a following nut.

13. The shifter of claim 12, wherein the indicator comprises a filament that is moveable from a first position to a second position.

14. The shifter of claim 12 wherein the hub comprises a case and a pulley assembly within the case, wherein rotation of the pulley assembly produces an axial translation of a rod coupled to the pulley assembly.

* * * * *